(12) United States Patent
Zhang et al.

(10) Patent No.: US 10,252,217 B2
(45) Date of Patent: Apr. 9, 2019

(54) CATALYTIC ARTICLES CONTAINING PLATINUM GROUP METALS AND NON-PLATINUM GROUP METALS AND METHODS OF MAKING AND USING SAME

(71) Applicant: BASF Corporation, Florham Park, NJ (US)

(72) Inventors: Qinglin Zhang, Manalapan, NJ (US); Ye Liu, Holmdel, NJ (US); Pascaline Harrison Tran, Holmdel, NJ (US); Xinsheng Liu, Edison, NJ (US); Michelle Casper, Plainsboro, NJ (US); Michael P. Galligan, Cranford, NJ (US); John R. Adomaitis, Old Bridge, NJ (US); Shau-Lin F. Chen, Shanghai (CN); Weiliang Feng, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/722,881

(22) Filed: May 27, 2015

(65) Prior Publication Data

US 2015/0352493 A1  Dec. 10, 2015

Related U.S. Application Data

(60) Provisional application No. 62/121,933, filed on Feb. 27, 2015, provisional application No. 62/008,212, filed on Jun. 5, 2014.

(51) Int. Cl.
*B01D 53/94* (2006.01)
*B01J 21/04* (2006.01)
(Continued)

(52) U.S. Cl.
CPC ............ *B01D 53/945* (2013.01); *B01J 21/04* (2013.01); *B01J 23/10* (2013.01); *B01J 23/42* (2013.01);
(Continued)

(58) Field of Classification Search
CPC .......... B01D 53/945; B01D 2255/2068; B01D 2255/20715; B01D 2255/2073;
(Continued)

(56) References Cited

U.S. PATENT DOCUMENTS 5,128,306 A * 7/1992 Dettling ............... B01D 53/945
423/213.5
7,204,965 B2 * 4/2007 Okawara .................. B01J 35/04
422/168

(Continued)

OTHER PUBLICATIONS

International Search Report dated Sep. 30, 2015.

*Primary Examiner* — Anthony J Zimmer
(74) *Attorney, Agent, or Firm* — Womble Bond Dickinson (US) LLP

(57) ABSTRACT

Aspects of the invention pertain to catalytic articles and methods of making catalytic articles comprising a first catalytic coating comprising a platinum group metal, wherein the first catalytic coating is substantially free of Cu, Ni, Fe, Mn, V, Co, Ga, Mo, Mg, Cr and Zn; a second catalytic coating comprising a non-PGM metal, wherein the second catalytic coating is substantially free of any platinum group metal; and one or more substrates, wherein the first catalytic coating is separated from the second catalytic coating, optionally with a barrier layer.

19 Claims, 18 Drawing Sheets

(51) Int. Cl.
*B01J 23/10* (2006.01)
*B01J 23/42* (2006.01)
*B01J 23/44* (2006.01)
*B01J 23/46* (2006.01)
*B01J 23/89* (2006.01)
*B01J 35/00* (2006.01)
*B01J 35/04* (2006.01)
*B01J 37/02* (2006.01)
*B01J 37/03* (2006.01)
*B01J 37/08* (2006.01)
*B01J 23/889* (2006.01)

(52) U.S. Cl.
CPC .............. *B01J 23/44* (2013.01); *B01J 23/464* (2013.01); *B01J 23/8892* (2013.01); *B01J 23/894* (2013.01); *B01J 23/8986* (2013.01); *B01J 35/0006* (2013.01); *B01J 35/04* (2013.01); *B01J 37/0244* (2013.01); *B01J 37/038* (2013.01); *B01J 37/08* (2013.01); B01D 2255/1021 (2013.01); B01D 2255/1023 (2013.01); B01D 2255/1025 (2013.01); B01D 2255/204 (2013.01); B01D 2255/209 (2013.01); B01D 2255/2042 (2013.01); B01D 2255/2045 (2013.01); B01D 2255/2047 (2013.01); B01D 2255/2061 (2013.01); B01D 2255/2063 (2013.01); B01D 2255/2065 (2013.01); B01D 2255/2066 (2013.01); B01D 2255/2068 (2013.01); B01D 2255/2073 (2013.01); B01D 2255/2092 (2013.01); B01D 2255/20715 (2013.01); B01D 2255/20723 (2013.01); B01D 2255/20746 (2013.01); B01D 2255/20769 (2013.01); B01D 2255/20784 (2013.01); B01D 2255/20792 (2013.01); B01D 2255/40 (2013.01); B01D 2255/407 (2013.01); B01D 2255/65 (2013.01); B01D 2255/908 (2013.01); B01D 2255/9022 (2013.01); B01D 2255/9025 (2013.01); B01D 2255/9032 (2013.01); B01D 2257/404 (2013.01); B01D 2257/502 (2013.01); B01D 2257/702 (2013.01); B01D 2258/012 (2013.01); *B01J 35/0026* (2013.01)

(58) Field of Classification Search
CPC .. B01D 2255/20784; B01D 2255/2047; B01D 2255/2061; B01D 2255/20792; B01D 2255/65; B01D 2255/20769; B01D 2255/209; B01D 2255/2045; B01D 2257/702; B01D 2257/502; B01D 2255/204; B01D 2255/2066; B01D 2255/9022; B01D 2255/20723; B01D 2255/908; B01D 2258/012; B01D 2255/9032; B01D 2255/2042; B01D 2255/20746; B01D 2255/407; B01D 2257/404; B01D 2255/9025; B01D 2255/2063; B01D 2255/40; B01D 2255/1025; B01D 2255/2092; B01D 2255/1021; B01D 2255/1023; B01D 2255/2065; B01J 35/0006; B01J 37/08; B01J 21/04; B01J 35/04; B01J 23/8892; B01J 23/464; B01J 23/44; B01J 37/0244; B01J 23/42; B01J 23/10

See application file for complete search history.

(56) References Cited

U.S. PATENT DOCUMENTS

| | | | |
|---|---|---|---|
| 2001/0053340 A1* | 12/2001 | Noda | B01D 53/945 423/213.2 |
| 2005/0164879 A1 | 7/2005 | Chen | |
| 2008/0044330 A1* | 2/2008 | Chen | B01D 53/945 423/213.5 |
| 2009/0099011 A1 | 4/2009 | Miura | |
| 2010/0240525 A1 | 9/2010 | Golden et al. | |
| 2011/0020201 A1* | 1/2011 | Luo | B01D 53/945 423/213.5 |
| 2011/0094211 A1* | 4/2011 | Kikuchi | B01D 53/945 60/299 |
| 2011/0143921 A1* | 6/2011 | Hao | B01D 53/944 502/74 |
| 2011/0182791 A1* | 7/2011 | Fedeyko | B01D 53/9436 423/237 |
| 2011/0305612 A1* | 12/2011 | Muller-Stach | B01D 53/945 423/212 |
| 2011/0305615 A1 | 12/2011 | Hilgendorff | |
| 2012/0283091 A1* | 11/2012 | Sunada | B01D 53/945 502/304 |
| 2013/0084222 A1* | 4/2013 | Grubert | B01J 29/04 422/170 |
| 2013/0115144 A1* | 5/2013 | Golden | C01G 25/00 422/170 |
| 2013/0195741 A1 | 8/2013 | Deeba et al. | |

* cited by examiner

CATALYTIC ARTICLES CONTAINING PLATINUM GROUP METALS AND NON-PLATINUM GROUP METALS AND METHODS OF MAKING AND USING SAME

CROSS-REFERENCE TO RELATED APPLICATIONS

This application claims the benefit under 35 U.S.C. § 119(e) to U.S. Provisional Application Nos. 62/121,933, filed Feb. 27, 2015 and 62/008,212, filed Jun. 5, 2014, the entire contents of which are incorporated herein by reference in their entirety.

TECHNICAL FIELD

Embodiments of the invention generally pertain to catalytic articles, and particularly those that contain both platinum group metals as well as non-platinum group metals.

BACKGROUND

Engine exhaust often contains incomplete combustion compounds such as hydrocarbons (HC), carbon monoxide (CO), and NOx. These compounds must be removed for air pollution control and to meet various government regulations. There are various catalysts and systems used for the treatment of such exhaust gas. For example, three-way catalysts (TWC), close-coupled catalysts, filters (which may be catalyzed) have been utilized to address challenging emission problems for different engines and fuel configuration. Most of these catalysts or combined catalysts systems are based on the precious metals (also known as "platinum group metals" or "PGM") of platinum (Pt), palladium (Pd), rhodium (Rh) and iridium (Ir). Although these precious metal catalysts are effective for mobile emission control and have been commercialized in industry, the extremely high cost of these precious metals remains to be a critical factor for wide spread applications of these catalysts.

Base metals are abundant and much cheaper than precious metals. Several attempts have been made to develop catalysts based on base metals for emission control. However, these base metal catalysts often do not have sufficient activity for saturated HC and NOx conversions and thermal stability to meet regulation requirements for mobile emission control.

Other attempts have been made to incorporate base metals into a precious metal catalyst material. However, such incorporation of base metal into a platinum group metal-based three-way catalyst washcoat or formulation resulted in a poisoning effect of the base metal, which results in degradation of PGM three-way catalyst performance.

Other base metal formulations were intended for HC or sulfur trapping purposes and are generally not efficient TWC catalyst. Although these examples showed some benefits in reduction of sulfur compounds, PGM are often poisoned by base-metal particularly after high temperature aging. Therefore, the addition of base-metals to the PGM formulations has not been very successful to significantly reduce the PGM loading thus the cost of the TWC catalysts.

Therefore, there is a need of alternative, cheaper catalyst materials that are also effective for the removal of hydrocarbons, CO and NOx compounds from mobile emission sources and meet increasingly stringent regulations.

SUMMARY

A first aspect of the invention pertains to a catalytic article. In a first embodiment, a catalytic article comprises a first catalytic coating comprising a platinum group metal, wherein the first catalytic coating is substantially free of Cu, Ni, Fe, Mn, V, Co, Ga, Mo, Mg, Cr and Zn; a second catalytic coating comprising a non-PGM metal, wherein the second catalytic coating is substantially free of a platinum group metal; and one or more substrates, wherein the first catalytic coating is separated from the second catalytic coating. In second embodiment, the first embodiment is modified such that the first catalytic coating is layered over the second catalytic coating. In a third embodiment, the first embodiment is modified such that the catalytic article further comprises a barrier layer between the first and second catalytic coatings.

In a fourth embodiment, the third embodiment can be modified, wherein the barrier layer is substantially free of first transition metals selected from Cu, Ni, Fe, Mn, V, Co, Ga, Mo, Mg, Cr and Zn. In a fifth embodiment the third or fourth embodiments can be modified, wherein the barrier layer is substantially free of platinum group metal. In a sixth embodiment, the third through fifth embodiments can be modified, wherein the barrier layer comprises a carrier selected from stabilized alumina, ceria, zirconia, ceria-zirconia composite, titania, and combinations thereof. In a seventh embodiment the third through the sixth embodiments can be modified, wherein the barrier layer further comprises a stabilizer for the carrier selected from barium, strontium, calcium, magnesium, as lanthana, neodymia, praseodymia, yttria or combinations thereof.

In an eighth embodiment, the first through seventh embodiments can be modified, wherein the first catalytic coating is in an upstream zone from the second catalytic coating. In a ninth embodiment, the eighth embodiment can be modified, wherein the upstream zone has a length of about 5 to about 90% of the substrate. In a tenth embodiment, the eighth and ninth embodiments can be modified, wherein the upstream zone has a length of about 30 to about 60% of the substrate.

In an eleventh embodiment, the first through tenth embodiments can be modified, wherein the platinum group metal comprises Pt, Pd, Rh or a combination thereof. In an twelfth embodiment, the first through tenth embodiments can be modified, wherein the platinum group metal is supported on a carrier comprising alumina, ceria, zirconia, ceria-zirconia composite, titania, or combinations thereof. In a thirteenth embodiment, the twelfth embodiment can be modified, wherein the carrier is stabilized by an element selected from the group consisting of La, Ba, Y, Pr, Sr and combinations thereof. In a fourteenth embodiment, the first through thirteenth embodiments can be modified, wherein the platinum group metal is present at a loading of about 1 to about 80 g/ft$^3$. In a fifteenth embodiment, the first through fourteenth embodiments can be modified, wherein the non-PGM metal comprises one or more of Cu, Ni, Fe, Mn, Ti, V, Co, Ga, Ca, Sr, Mo, Ba, Mg, Al, La, Zn and Ce. In a sixteenth embodiment, the first through fifteenth embodiments can be modified, wherein the non-PGM metal is in the form of an oxide, spinel or perovskite. In a seventeenth embodiment, the first through sixteenth embodiments can be modified, wherein the non-PGM metal is supported on a carrier comprising alumina, ceria, zirconia, ceria-zirconia composite, titania, zeolite materials or combinations thereof. In an eighteenth embodiment, the seventeenth embodiment can be modified, wherein the carrier is stabilized.

In a nineteenth embodiment, the first through eighteenth embodiments can be modified, wherein the non-PGM metal is present at a loading of greater than 0 to about 50 wt % of the total second catalytic loading. In a twentieth embodiment the first through the nineteenth embodiments can be modified, wherein the first catalytic coating is on a first substrate and the second catalytic coating is on a second substrate, and the substrates are in contact with each other. In a twenty-first embodiment the first through the nineteenth embodiments can be modified wherein the first and second catalytic coatings are on the same substrate. In a twenty-second embodiment the first through the twenty-first embodiments can be modified, wherein the total catalyst coating comprises about 5 to about 90% by weight PGM.

In a twenty-third embodiment the first through the twenty-second embodiments can be modified, wherein the non-PGM metal is supported on carrier comprising one or more of alumina and stabilized alumina, and the platinum group metal is supported on a carrier comprising one or more of titania, silica ceria, ceria-zirconia composite, and ceria-zirconia composite promoted with one or more of La, Nd, Pr, and Y.

A twenty-fourth embodiment pertains to a method of making the catalytic article of the first through twenty-third embodiments, the method comprising: providing a first slurry comprising a platinum group metal, wherein the first slurry is substantially free of Cu, Ni, Fe, Mn, V, Co, Ga, Mo, Mg, Cr and Zn; providing a second slurry comprising a non-PGM metal, wherein the second slurry is substantially free of any platinum group metal; coating one or more substrates with the first and second slurries to provide the catalytic article of the first through twenty-third embodiments; and calcining the catalytic article at a temperature ranging from about 300 to about 1100° C.

A twenty-fifth embodiment pertains to a method of treating the exhaust from an internal combustion engine, the method comprising contacting the exhaust from the engine with the catalytic article of first through twenty-third embodiments.

DETAILED DESCRIPTION

Figure 1B:
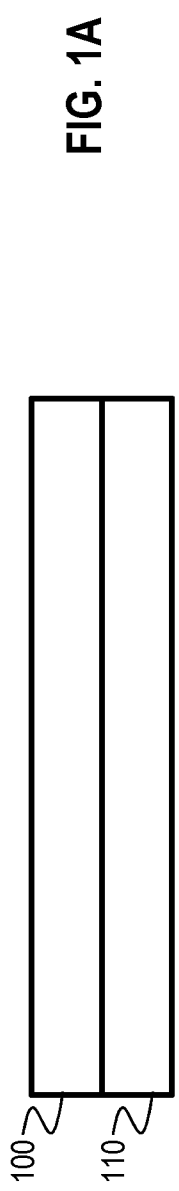
FIGS. 1A-1B show catalytic coatings in accordance with one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

Aspects of the invention provide catalytic materials that take advantage of high efficiency of precious metals and low cost of non-PGM metals to combining them in a way such that both precious metals and base-metal catalyst components work effectively and coordinately for efficient CO, NOx and HC conversions. In certain embodiments, there is a separation of precious metals from non-PGM metals for significant reduction in precious metals loading and catalyst cost.

Accordingly, one aspect of the invention provides for a catalytic article. In some embodiments, the catalytic article comprises a first catalytic coating comprising a platinum group metal, wherein the first catalytic coating is substantially free of Cu, Ni, Fe, Mn, V, Co, Ga, Mo, Mg, Cr and Zn. The catalytic article may further comprise a second catalytic coating comprising one or more non-PGM metals selected from the group consisting of Cu, Ni, Fe, Mn, Ti, V, Co, Ga, Ca, Sr, Mo, Ba, Mg, Al, La, Zn and Ce, wherein the second catalytic coating is substantially free of any platinum group metal. The catalytic article may also comprise one or more substrates. In some embodiments, the first catalytic coating is separated from the second catalytic coating.

As used herein, "substantially free" of Cu, Ni, Fe, Mn, V, Co, Ga, Mo, Mg, Cr and Zn means that there is less than 0.1 wt % Cu and less than 0.5 wt % of Ni, Fe, Mn, V, Co, Ga, Mo, Mg, Cr and Zn in the first (PGM) catalytic coating.

As used herein, "substantially free" of any PGM means there is less than 5 wt % of platinum (Pt), palladium (Pd), rhodium (Rh) and iridium (Ir). In some embodiments, there is less than 4, 3, 2, 1.5, 1, 0.5 or 0.2 wt % of the aforementioned PGM metals.

As used herein, a first catalytic coating that is "separated" from a second catalytic coating means that the coatings are not mixed, although there may be contact between the two coatings. In one or more embodiments, the coatings may be separated by a catalytically inactive and inert (barrier) layer.

As used herein, "Non-PGM metals" refers to a metal selected from the group consisting of Cu, Ni, Fe, Mn, Ti, V, Co, Ga, Ca, Sr, Mo, Ba, Mg, Al, La, Zn and Ce.

Suitable substrates include various monoliths. Examples of suitable monoliths include wall flow and flow through catalysts. Monolith structures can offer high geometric surface area, excellent thermal and mechanical strength that is particularly suitable for mobile emission control. Any monolith structure can be used that include ceramic, metallic such as FeCralloy, stainless steel and other metal or alloys. Monoliths can be of straight channel or pattern channels or in foam or other structures.

As used herein, "E3" refers to the Euro 3 emission standard, which requires less than 2 g/Km CO, 0.8 g/Km THC and 0.15 g/Km NOx.

As discussed above, emissions from mobile sources include CO, $CO_2$, hydrocarbons, water, NOx and sulfur compounds. Potential three-way catalytic reactions include:

CO: WGS/Oxidation:

$$CO+H_2O \rightarrow CO_2+H_2$$

$$CO+O_2 \rightarrow CO_2$$

HC: Reforming/Oxidation:

$$HC+O_2 \rightarrow CO_2+H_2O$$

$$HC+H_2O \rightarrow CO_2+H_2+CO$$

NOx: Selective Catalytic Reduction (SCR) with HC, CO and $H_2$ as Reductants:

$$NO_x+CO/HC \rightarrow N_2+CO_2$$

$$NO_x+H_2 \rightarrow N_2+H_2O$$

Other Reactions:

$$H_2+O_2 \rightarrow H_2O$$

Figure 1A:
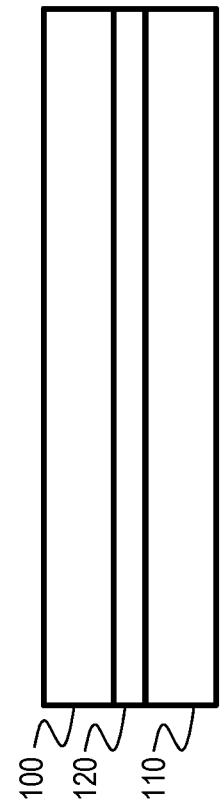
Figure 2:
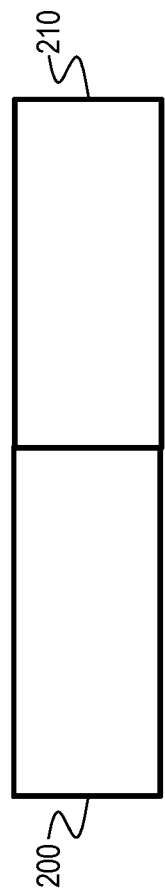
FIG. 2 shows a catalytic coating in accordance with one or more embodiments of the invention.

Oxygen storage component (OSC) Redox reactions, such as $Ce_2O_3+O_2 \rightarrow CeO_2$ In one or more embodiments, the catalytic article provided herein allows for reduction of the amount of precious metal used by utilizing non-PGM metals to remove some of the pollutants. Specifically, precious metals in the first catalytic layer may be used to treat NOx, while the non-PGM metals are used to treat CO and hydrocarbons. Poisoning of the precious metal by the non-PGM metal is prevented by ensuring separation of the platinum group metal and non-PGM metal Therefore, in one or more embodiments, the first catalytic coating is layered over or under the second catalytic coating. FIG. 1A demonstrates such an embodiment. The first catalytic coating 100 (containing PGM) is shown overlying the second catalytic coating 110 (containing one or more non-PGM metals). Both coatings may deposited onto a surface of a monolith structure (not shown).

In alternative embodiments, the first or second catalytic coating permeates the walls of a substrate. In some embodiments, the substrate may be a filter or a wall flow monolith. The wall flow monolith may have a plurality of longitudinally extending passages formed by longitudinally extending walls bounding and defining said passages, wherein the passages comprise inlet passages having an open inlet end and a closed outlet end, and outlet passages having a closed inlet end and an open outlet end. As used herein, the term "permeate" when used to describe the catalyst on the substrate, means that the catalyst composition is dispersed throughout the wall of the substrate. Other catalytic coatings may then be layered over the catalytic coating that permeates the walls of the substrate.

In other embodiments, the first catalytic coating and second catalytic coating are separated by a barrier layer. FIG. 1B demonstrates this embodiment. The first catalytic coating 100 is shown overlying a barrier layer 120, which overlies the second catalytic coating 110. Second catalytic coating 110 overlies may overly the surface of a monolith structure (not shown). Barrier layer 120 aids in the separation of platinum group metal catalyst from non-PGM metal, which in turn to help minimize the poisoning effect of the non-PGM metal on the platinum group metal catalyst. In some embodiments, the base layer has a specific porosity to allow gas to diffuse while also strongly adsorbing volatilized non-PGM metal which would otherwise poison the platinum group metal. In some embodiments, the barrier layer may comprise alumina or other ceramic materials.

In further embodiments, the catalytic article further comprises a barrier layer between the first and second catalytic coatings. FIG. 1B demonstrates this embodiment. While the first catalytic coating 100 still overlies the second catalytic coating 110, now they are separated by an intermediate barrier layer 120.

According to one or more embodiments which include a barrier layer 120, the barrier layer 120 is substantially free of both platinum group metal and first transition metals such as Cu, Ni, Fe, Mn, V, Co, Ga, Mo, Mg, Cr and Zn. Further, in one or more embodiments, the barrier layer comprises a carrier including stabilized alumina, ceria, zirconia, ceria-zirconia composite titania, or combinations thereof. According to one or more embodiments, suitable stabilizers for the carrier include an alkaline earth metal, for example, barium, strontium, calcium, magnesium, and rare earth metals, for example, lanthana, neodymia, praseodymia, yttria and combinations thereof. These stabilizers may also function as a $NO_x$ (nitrous oxide or dioxides) or sulfur trap for the first transition metals in the first catalytic coating.

In yet other embodiments, the first catalytic coating is in an upstream or downstream zone from the second catalytic coating. That is, the catalytic coatings may be present on a single monolith in zones. In further embodiments, the inlet section of a monolith is coated with the first catalytic coating containing the platinum group metal catalyst, while the outlet zone is coated with the second catalytic coating containing non-PGM metal. In such cases, the first catalytic coating is upstream of the second catalytic coating. Emission gas flows from the inlet to the outlet zones. Such zoned coating provides thermodynamically-limiting oxidants/reductants and kinetics needed for near complete conversion of HC, CO and NOx under both rich and lean operating cycles. Zoned coating also serves as effective mean to separate platinum group metal from base-metals and avoid the negative interaction of non-PGM metals on platinum group metal.

As noted, in some embodiments, the first catalyst coating is over or upstream of the second catalyst coating. This ordering of coating allows for three-way treatment of exhaust gases. Upstream exhaust passes through platinum group metal first where, high reductant concentrations of CO and HC improves NOx conversion. Unconverted CO and HC are then removed over downstream non-PGM metal zone of the TWC catalyst. Zoning may be varied. For example, in one or more embodiments, the upstream zone or platinum group metal section has a length of about 5, 10, 15, 20, 25 or 30 to about 60, 65, 70, 75, 80, 85 or 90% of the substrate. In some embodiments, the upstream zone has a length of about 30 to about 60% of the substrate.

In other embodiments, the catalytic article may comprise two stacked monoliths, end on end. In further embodiments, the first or upstream monolith contains the PGM catalyst and the second or downstream monolith contains the non-PGM catalyst.

The catalytic article contains a first catalyst coating comprising platinum group metal. In some embodiments, the platinum group metal comprises Pt, Pd, Rh, Ir or a combination thereof. In one or more embodiments, the first catalyst coating comprises only one of Pt, Pd and Rh. In some embodiments, all three of Pt, Pd and Rh are present in the first catalyst coating. Two PGM metals may be present in any combination, as well, including Pd and Rh, Pt and Pd, or Pt and Rh.

In some embodiments, the platinum group metal is supported on a carrier comprising alumina, ceria, titania, or combinations thereof. In one or more embodiments, the carrier is stabilized by an element selected from the group consisting of La, Ba, Y, Pr, Sr and combinations thereof. In some embodiments, the platinum group metal is present at a loading of about 2, 3, 4 or 5 to about 20, 25, 30 35 or 40 g/ft$^3$. PGM active metals may be in the form of nanoparticles. In some embodiments, the PGM may be single metal nanoparticles. In other embodiments, the PGM metals may be separate (not alloyed) particles.

The second catalytic coating contains one or more non-PGM metals. In some embodiments the non-PGM metal comprises one or more of Cu, Ni, Fe, Mn, Ti, V, Co, Ga, Ca, Sr, Mo, Ba, Mg, Al, La, Zn and Ce. In further embodiments, the non-PGM metal comprises Ni, Mn, Mo, Ga, Fe, Cu, Re, Mg and/or Ba. In one or more embodiments, the non-PGM metal is in the form of an oxide, spinel or perovskite. In one or more embodiments, the non-PGM metal is supported on a carrier comprising alumina, ceria, zirconia, ceria-zirconia composite, titania, zeolite materials or combinations thereof. The carrier may be stabilized. In one or more embodiments, the non-PGM metal is present at a loading of greater than 0, 1 or 2 to about 20, 25, 30, 35, 40, 45 or 50 wt % of the total second catalytic loading. In some embodiments, the second catalytic coating comprises Cu, Mn or both.

In one or more embodiments, the first catalytic coating is on a first substrate and the second catalytic coating is on a second substrate, and the substrates are in contact with each other. In some embodiments, the first and second catalytic coatings are on the same substrate. In one or more embodiments, the total catalyst coating comprises about 5 to about 90% by weight PGM. In some embodiments, the non-PGM metal is supported on carrier comprising one or more of alumina and stabilized alumina, and the platinum group metal is supported on a carrier comprising one or more of ceria, ceria-zirconia, titania and silica.

Another aspect of the invention pertains to methods of preparing the catalytic article described herein. In one or more embodiments, the method first comprises providing a first slurry comprising a platinum group metal, wherein the first slurry is substantially free of any non-PGM metal. Then, a second slurry comprising a non-PGM metal may be provided, wherein the second slurry is substantially free of any platinum group metal. Then one or more substrates may be coated with the first and second slurries to provide a catalytic article. The catalytic article may then be calcined at a temperature ranging from about 300 to about 1100° C.

The active catalysts can be applied to monolith surface using slurry coating, spray coating and any others process. In case of the supported non-PGM metal formulations, pre-made supports such as ceria-alumina may be used for impregnation of the solution of active non-PGM metal or combination of non-PGM metals. The resulting catalyst can either be mixed with suitable binder or calcined first then mixed with binder to make suitable slurry for monolith coating. Alternatively, one or more active non-PGM metals deposited in one support may be mixed with other non-PGM metal catalysts deposited in another support to make slurry for monolith washcoating.

The catalyst supports may further contain oxygen storage components (OSC) whose valence state can be switched under emission conditions. In some embodiments, the support is ceria. The OSC may further contain elements/components to improve the reducibility of the OSC component and to stabilize the OSC component against loss of surface area and structure integrity under high temperature hydrothermal aging condition. These promoting elements include Pr, Al, La, Zr, Sm, etc. and their combinations. The contents of these elements are in the range of 0, 0.5, or 1 to 45, 50, 55 or 60 wt %.

The OSC component and the promoters can be prepared into solid phase mixtures through wet chemistry process such as co-precipitation, aging, drying and calcination or dry process of CVD (chemical vapor deposition), aerosol spray dry/calcination, plasma or other processes. These elements can also be added together with active non-PGM metal components during catalyst preparation without use of the pre-formed oxides as supports.

The final coated monolith catalysts can be dried at 120° C. for 2 h and calcined in a temperature ranging from 300-1000° C., or more particularly in the range of 400-950° C., or more particularly in the range of 450-550° C.

In some embodiments, PGM metals may be separate nanocrystals dispersed on alumina, zicornia, titania or ceria. Non-PGM metals may be in the form of nanocrstals of oxides, metal, peroviskites and spinels structures dispersed on similar carrier oxides. The particular structure transformation depends on aging temperature. Affinity and crystalline size of various structure (or transformation) depend on aging conditions.

In case of non-pre-made supports used in catalyst preparation, the desired non-PGM metal and their combination may be mixed with OSC and OSC promoters to form a homogeneous solution. Then, the solution pH can be adjusted through addition of NH$_4$OH or ammine or other structure directing agents (such as polymer or surfactants) for co-precipitation. The mother solution can be aged to suitable particle size for monolith coating. The precipitates may also be separated use filtering for drying and calcination. The calcined based metal solid phase mixture can then be used for making slurry and monolith coating.

In particular, one or more of the catalysts described are suitable as three-way catalysts. That is, they are able to simultaneously treat NOx, hydrocarbons and CO from exhaust. Another aspect of the invention pertains to a method of treating the exhaust from an internal combustion engine, for example, a utility or motorcycle engine, the method comprising contacting the exhaust from the engine with a catalytic article described herein.

The catalyst articles described herein may be used for any engine, including automotive as well as stationary engines. In some embodiments, the catalytic articles are suitable for small engines because these engines require low cost catalysts, have short life cycle requirements and have less stringent emission regulations compared to automobile emission control. Additionally, small engines do not allow for active engine control for other types of exhaust treatment such as NOx trapping, which require such active engine control. Small engines run oscillate between running slightly rich and lean. The catalyst need to be highly active and low cost for simultaneous conversion of CO, HC and NOx. In one or more embodiments, "small engine" is used to refer to an engine that has an engine displacement of about 50 cc to about 2500 cc. Examples of such small engines such as motorcycle and utility engines, particularly gasoline engines and diesel engines. Examples of suitable utility engines include lawn and garden equipment engines. In some embodiments, motorcycle engines have an engine displacement of about 1200 to about 2000 cc. Utility engines may have an engine displacement of about 50 cc.

EXAMPLES

Catalyst Preparation: Non-PGM Metal Formulations

Two non-PGM metal formulations were prepared as follows:

Non-PGM Coating A 146.20 g $Cu(NO_3)_2.3H_2O$, 179.04 g $Co(NO_3)_2.6H_2O$, 194.67 g $Ni(NO_3).2.6H_2O$, 252.99 g $Fe(NO_3).2.9H_2O$ and 144.36 g of $Mn(NO_3).2.4H_2O$ were dissolved in 177 g water. The dissolved solution was then mixed with 150 g $CeO_2$. 75 g of alumina were added into 202 g water, and the mixture milled to X90<15 micron. An alumina slurry is then combined with $CeO_2$-containing mixture. 25 g alumina-based binder was then added into the resulting slurry.

Non-PGM Coating B 102.3 g of $Cu(NO_3)_2.3H_2O$ and 50.53 g $Mn(NO_3).2.4H_2O$ were dissolved in in 124 g of water. The solution was then mixed with 105 g of $CeO_2$. 175 g of alumina was added into 253 g of water and the mixture milled. An alumina slurry is then combined with $CeO_2$-containing mixture. 25 g of alumina-based binder was added into the resulting slurry.

Catalyst Preparation: Platinum Group Metal Coat

Seven formulations containing various PGM ratio and loadings were prepared. The specific breakdown of PGM components is shown in the various PGM coatings in Table 1. First, an alumina slurry was prepared by mixing 78 g alumina, 98 g of deionized water and 5 g of tartaric acid. The mixture was then milled to a desired particle size of about X90=~15 micron.

$Rh/CeO_2$:

18.5 g deionized water was added to 2.63 g of Rh nitrate solution (Rh, 10.1 wt %). The resulting solution was added drop-wise to 38.17 g $CeO_2$ with agitation.

$Pt/CeO_2$:

20.4 g of deionized water was added to 1.65 g of Pt nitrate solution (Pt, 15.92 wt %). The resulting solution was added drop-wise to 38.17 g $CeO_2$ with agitation.

$Pd/CeO_2$—$ZrO_2$:

191.7 g of deionized water was added to 11.34 g of Pd nitrate solution (Pd, 20.87 wt %). The resulting solution was added drop-wise to 340.221 g of $CeO_2$—$ZrO_2$ with agitation.

PGM slurry: TEAOH was added to 415 g of deionized water to adjust pH to range of 4-5. PGM-containing powder was added into the above solution gradually and pH adjusted to the range of 3-5 by addition of TEAOH. 50 g of Zr nitrate solution (Zr, 20 wt %) were then added. 385 g of water was then added, following by milling to a particle size of about X90=~15 micron.

The alumina slurry was mixed with the PGM slurry for use as a top coat slurry.

Layered Washcoats: Non-PGM-Metal Bottom Coat+PGM Top Coat

Figure 3:
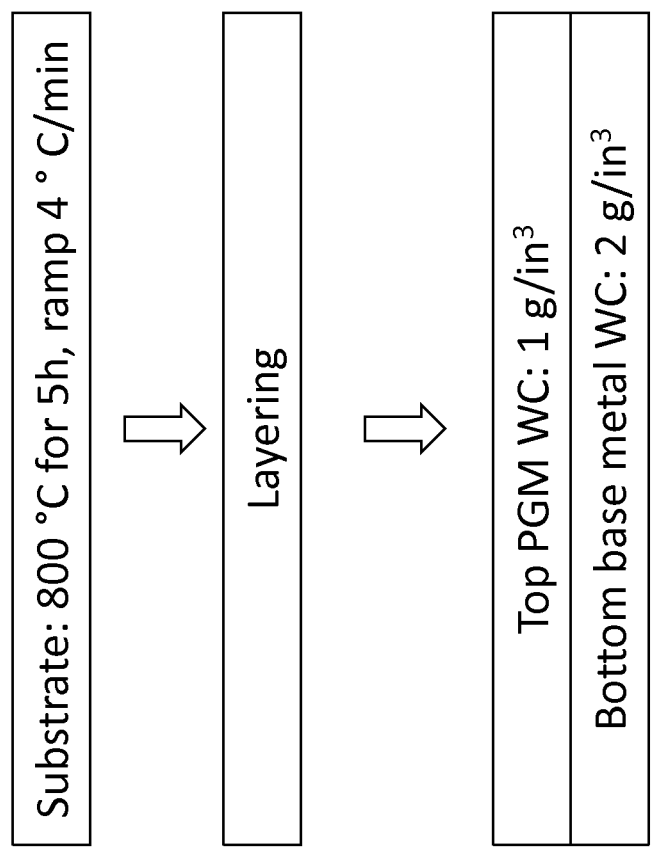
FIG. 3 shows a scheme for preparing a catalytic article in accordance with one or more embodiments of the invention.

A metallic monolith (40 mm D×90 mm L) of 300 cpsi was pre-oxidized at a temperature 800° C. for 5 h prior to coating. The non-PGM metal slurry was used as bottom/under coat with a target washcoat loading about 2 g/in³. The coated sample was then dried at 120° C. for 2 h and 550° C. for 2 h. The layering coating process and washcoat structure is illustrated in FIG. 3.

Example 1

The PGM-containing slurry was used as a top coat with a washcoat loading of about 1 g/in³. PGM ratio and the total PGM loading for this example are given in Table 1 below. Following PGM coating, the sample was dried at 120° C. for 2 h and calcined at 550° C. for 1 h.

Examples 2-10

Other example catalysts listed in table 1 were prepared following the same procedure as that described in Example 1, except that a different PGM ratio and loading was used in each given example, as shown in Table 1 below. Examples 9 and 10 are comparative, as they only contained non-PGM metal.

TABLE 1

List Of Layering Coating Examples

| | Top Coat Pt/Pd/Rh weight ratio | | | | Bottom Coat |
|---|---|---|---|---|---|
| | Pt | Pd | Rh | PGM/ft³ | |
| Example 1 | 1 | 9 | 1 | 10 | Non-PGM coating A |
| Example 2 | 1 | 0 | 0 | 5 | Non-PGM coating A |
| Example 3 | 0 | 1 | 0 | 10 | Non-PGM coating A |
| Example 4 | 0 | 0 | 1 | 4 | Non-PGM coating A |
| Example 5 | 0 | 9 | 1 | 10 | Non-PGM coating A |
| Example 6 | 1 | 9 | 0 | 10 | Non-PGM coating A |
| Example 7 | 1 | 0 | 1 | 5 | Non-PGM coating A |
| Example 8 | 0 | 1 | 0 | 10 | Non-PGM coating B |
| Example 9 (Comparative) | Non-PGM coating A | | | | Non-PGM coating A |
| Example 10 (Comparative) | Non-PGM coating B | | | | Non-PGM coating B |

Zoned Washcoats: PGM Inlet Coat and Non-PGM-Metal Outlet Coat

Examples 11-13

A pre-oxidized metallic monolith was first coated with an alumina and ceria mixture (55 wt % alumina in washcoat) with a washcoat loading of 3 g/in³. The coated sample was then dried and calcined prior to loading of PGM (50% zone) and Cu and Mn non-PGM metals (50% zone). The PGM loading based on the whole monolith is kept at 10 g/ft³, Cu at 215 g/ft³ and Mn at 85 g/ft³.

PGM was loaded by impregnation of desired amount of PGM containing solution to 50% of monolith following by the same dry and calcination procedure listed above. Cu and Mn were loaded by impregnation of CuMn-containing solution of the desired concentration on to remaining 50% monolith. The resulting catalyst was dried at 120° C. for 2 h and calcined in air at 550° C. for 2 h.

Figure 4:
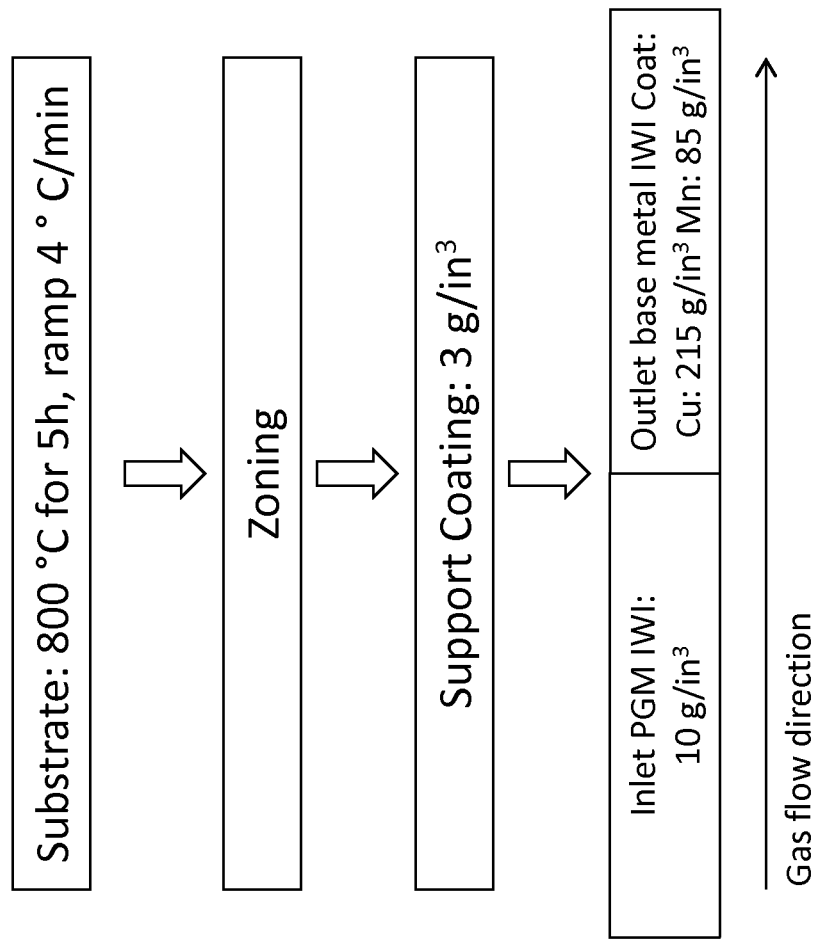
FIG. 4 shows a scheme for preparing a catalytic article in accordance with one or more embodiments of the invention.

The zone coating process is illustrated in FIG. 4. Details for examples 11-13 are given in Table 2 below.

TABLE 2

Zone Coating Examples

| | Inlet 50% Zone PGM coating | Outlet 50% Zone CuMn coating |
|---|---|---|
| Example 11 | Pt: 10 g/ft³ | Cu: 215 g/ft³ Mn: 85 g/ft³ |
| Example 12 | Pd: 10 g/ft³ | Cu: 215 g/ft³ Mn: 85 g/ft³ |
| Example 13 | Rh: 10 g/ft³ | Cu: 215 g/ft³ Mn: 85 g/ft³ |

Several of the catalyst samples were aged at 900° C. under air flow for 4 h followed by aging in nitrogen flow at 900° C. for 4 h.

Catalyst Performance Test
  Lab Reactor Tests
  Several lab reactor tests were conducted using a metallic substrate (1"D×1"L, 300 cpsi). The reactor was operated at a GHSV of 14,000 h$^{-1}$ with lambda sweeping and light-off measurements as shown in Table 3 below. Lambda was varied by changing CO flow and keeping air flow constant.

TABLE 3

| Lab Reactor Operating Conditions | | |
| --- | --- | --- |
| Lambda sweeping | 450° C. | |
| Gas Space velocity | 140,000 hr$^{-1}$ | |
| Gas feed composition | CO | ~0.5-5.6% |
| | CO$_2$ | ~10% |
| | HC (C1) | ~1350 ppm (C$_3$H$_6$/C$_3$H$_8$ = 2) |
| | NO | ~400 ppm |
| | H$_2$O | ~7% |

Figure 5:
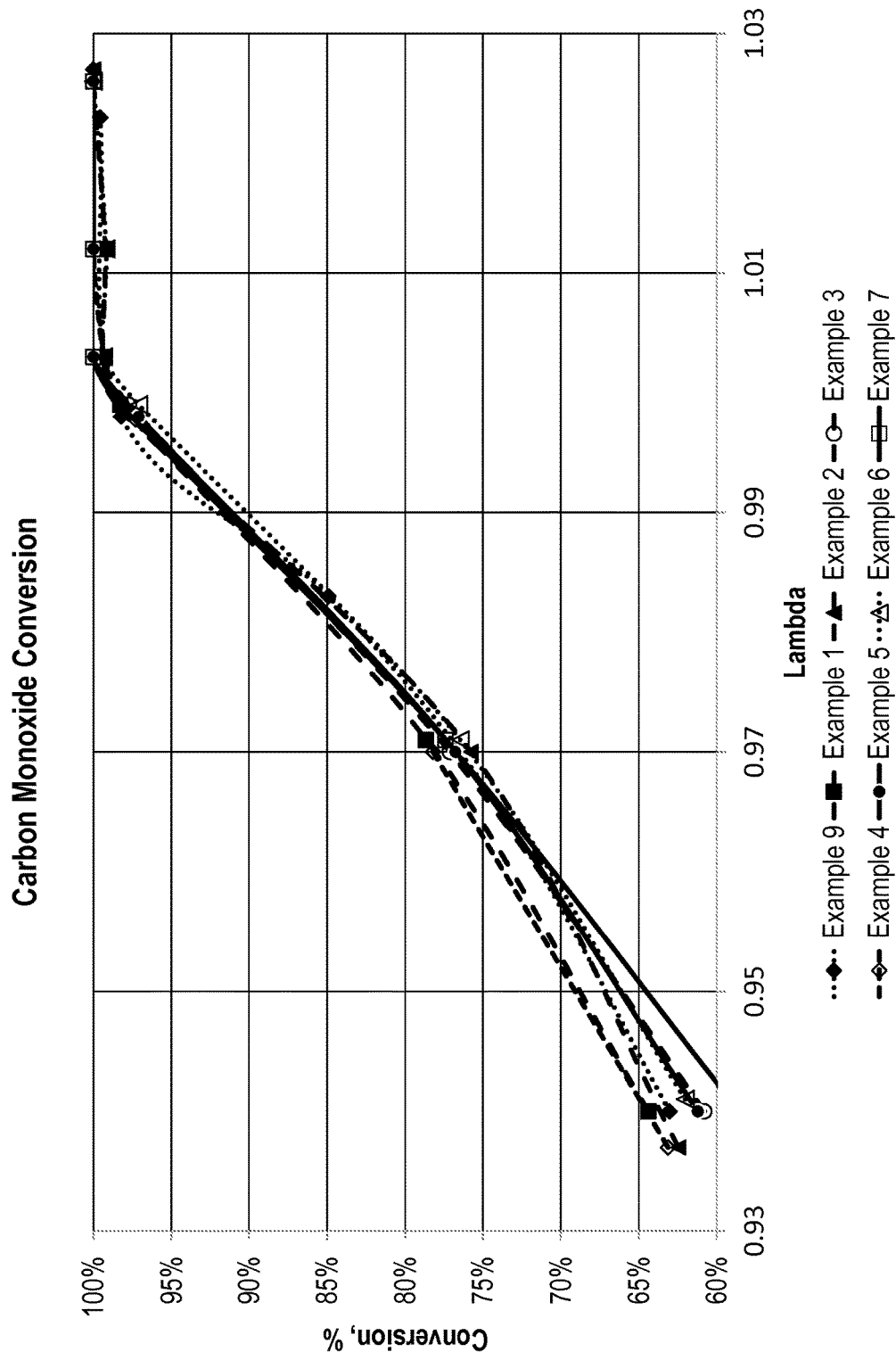
FIG. 5 shows carbon monoxide conversion for several catalytic articles.
Figure 6:
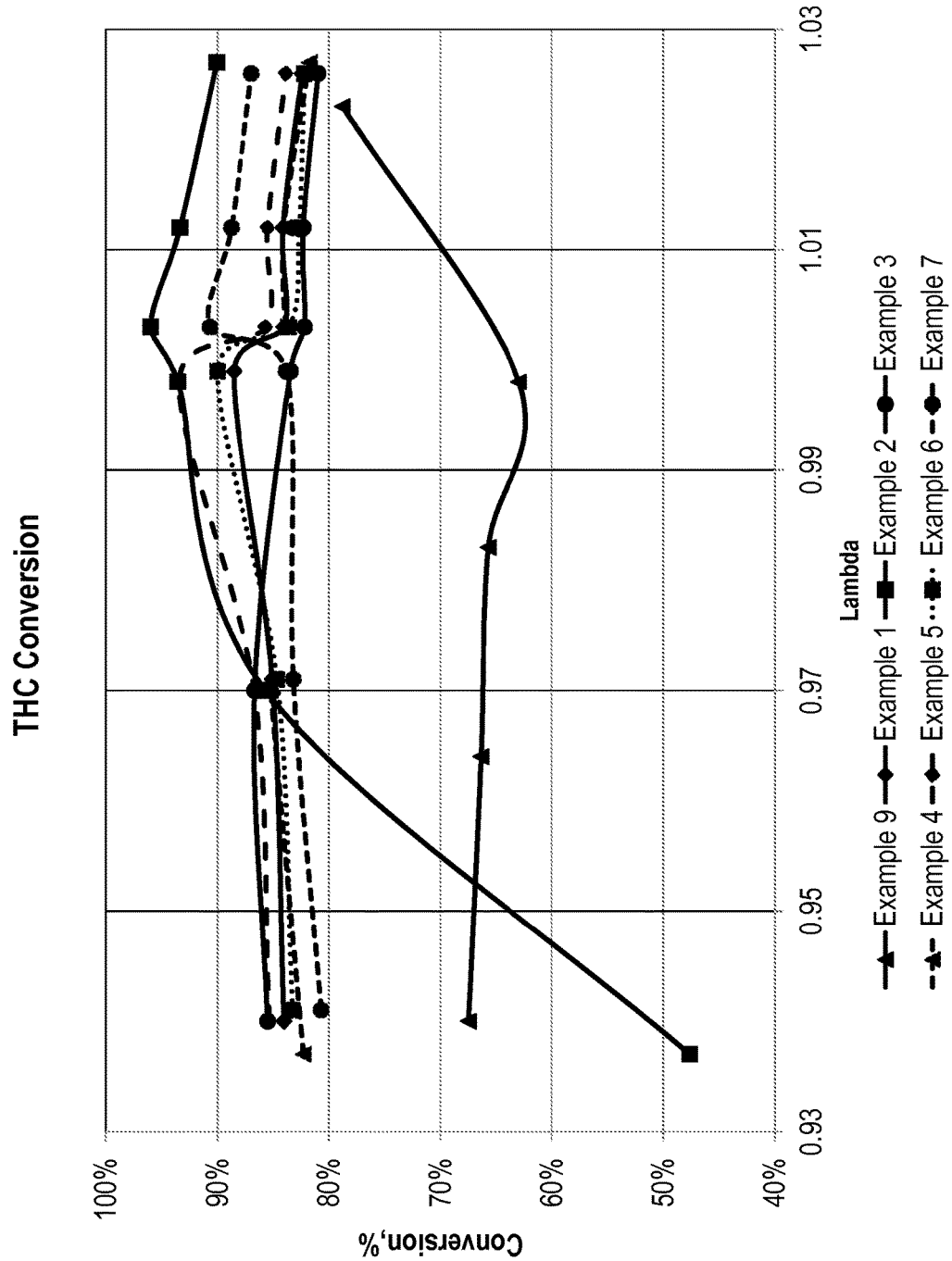
FIG. 6 shows total hydrocarbon conversion for several catalytic articles.
Figure 7:
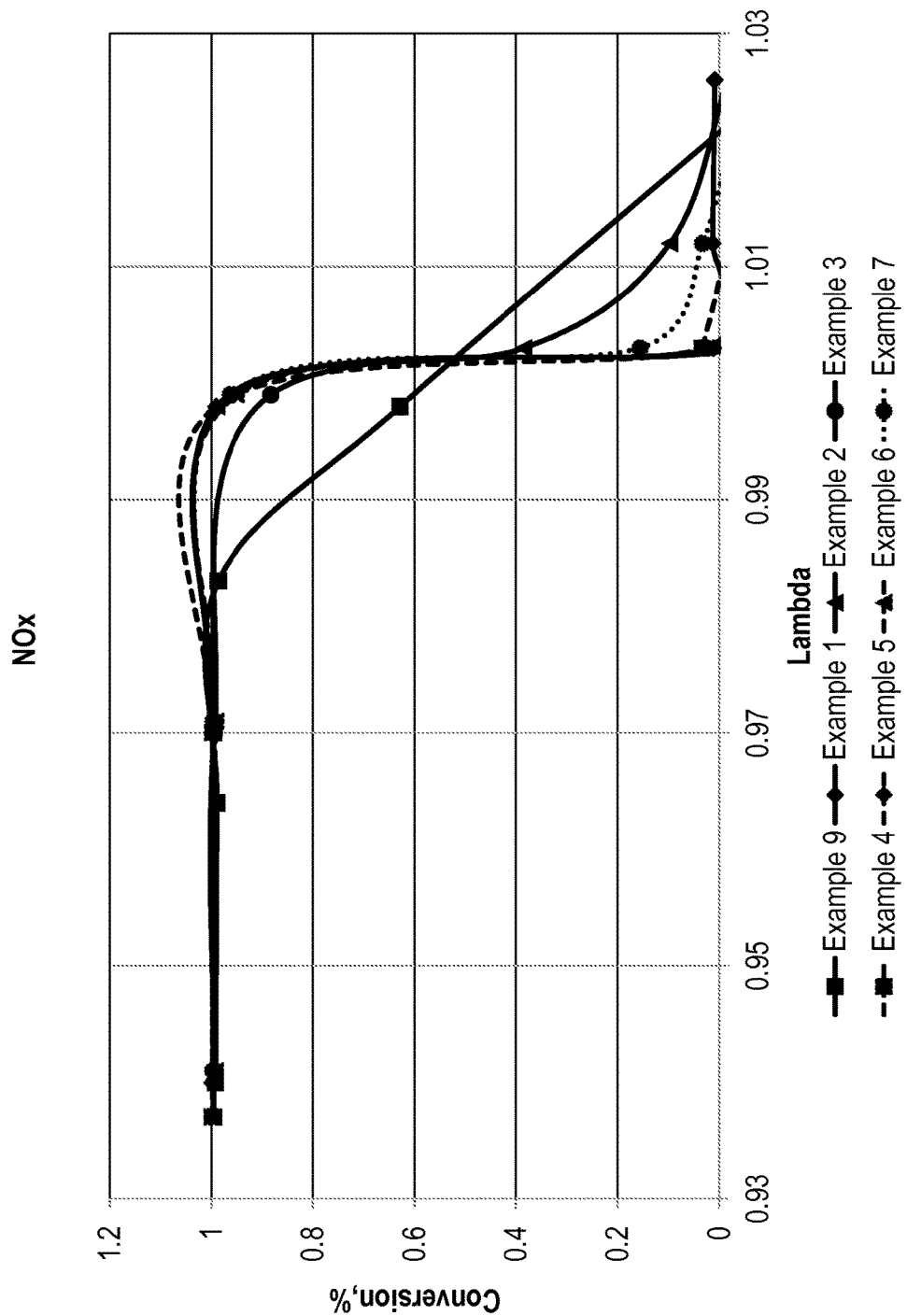
FIG. 7 shows NOx conversion for several catalytic articles.

FIG. 4 shows the results of carbon monoxide (CO) conversion. FIG. 5 shows the results of total hydrocarbon (THC) conversion. FIG. 6 shows the results of the NOx conversion. As seen from the graphs, compared to non-PGM metal catalyst (Comparative Example 9), THC and NOx conversions are significantly improved with an additional PGM top layer (Examples 1-7).

Motorcycle Engine Tests

Motorcycle engine tests were performed with 40 mm×90 mm metal monolith (300 cpsi) samples on two types of commercial motorcycles, one runs rich and another lean.

Figure 8:
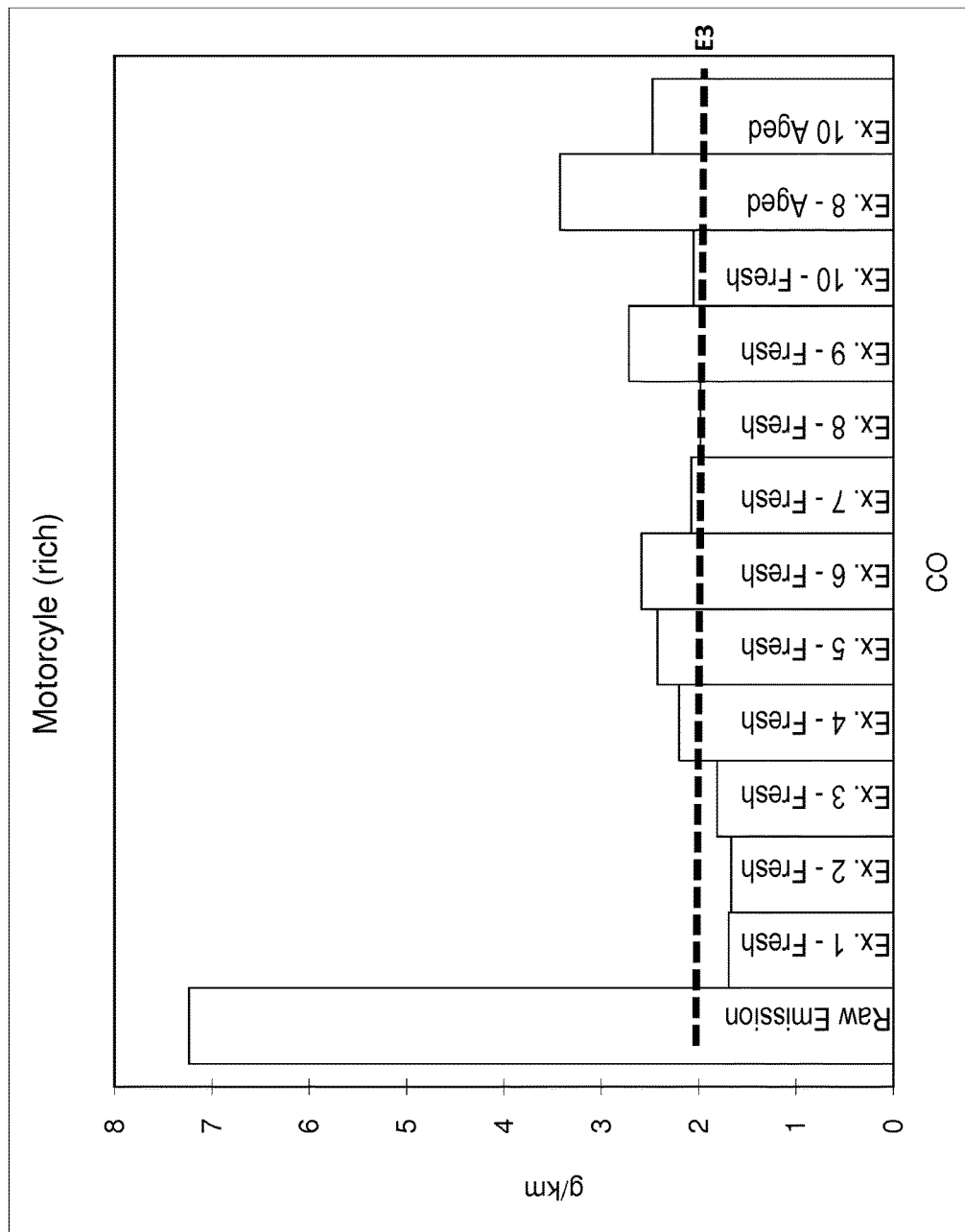
FIG. 8 shows the emission of carbon monoxide after treatment with several catalytic articles.
Figure 9:
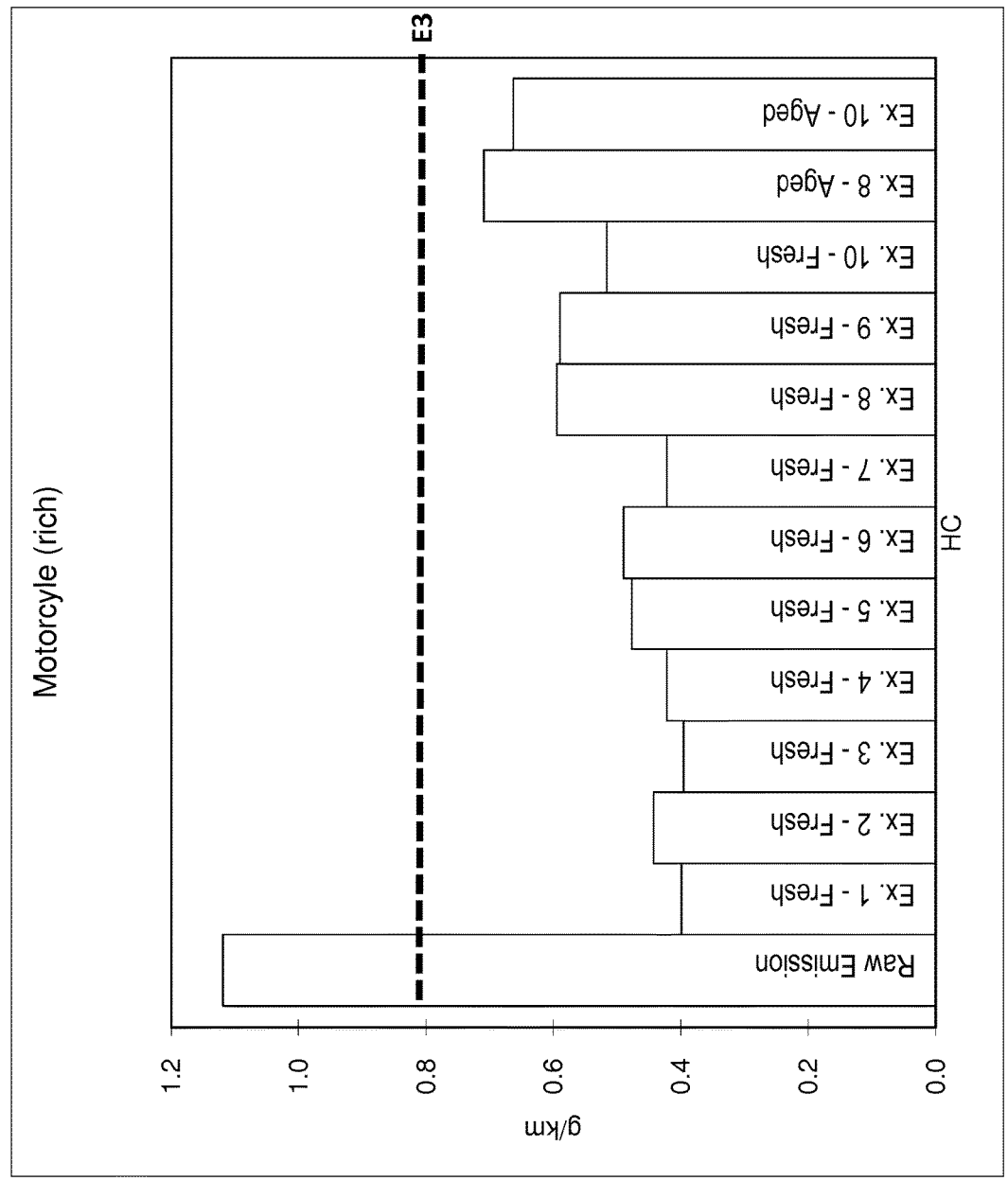
FIG. 9 shows the emission of total hydrocarbons after treatment with several catalytic articles.
Figure 10:
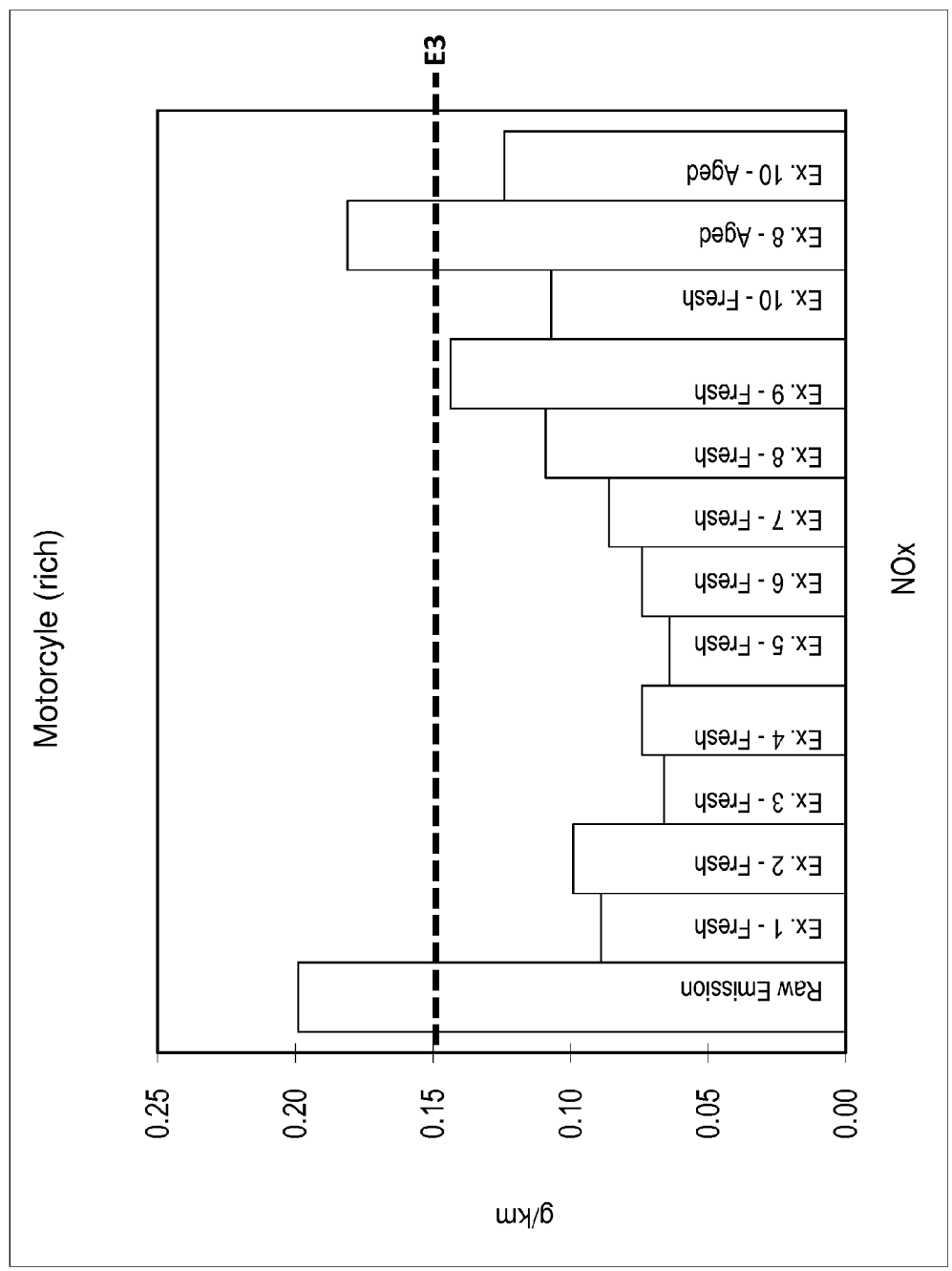
FIG. 10 shows the emission of NOx after treatment with several catalytic articles.

Layered Washcoat Structure: Motorcycle (Rich)
  The results of the motorcycle engine tests using the layered catalysts and comparative catalysts, some of which were also tested aged, are shown in FIGS. 8-10. FIG. 8 shows the results of carbon monoxide emissions, FIG. 9 shows the results of hydrocarbon emissions and FIG. 10 shows the results of NOx emissions.

As seen from the figures, TWC activities of the combined samples with minor PGM-containing top layer and the CuCoNiFeMn formulation (formulation A) as the bottom layer were higher than that of the non-PGM-metal only sample for this rich motorcycle engine.

Although the CuMn formulation (B) shows good TWC activity and reasonable thermal stability, this formulation combined with a Pd-containing top coat did not show improvement in TWC performance (last four bars in FIGS. 8-10). Loss in TWC activity of the example 8 catalyst is likely due to poisoning effect of CuMn on PGM even with layered washcoat structure. It is thought that it may beneficial to have an additional barrier layer or zone coating for this formulation.

As further seen from the figures, the fresh catalysts including the non-PGM-metal only (CuMn) formulation meet E3 emission target when operated with this rich engine.

Figure 11:
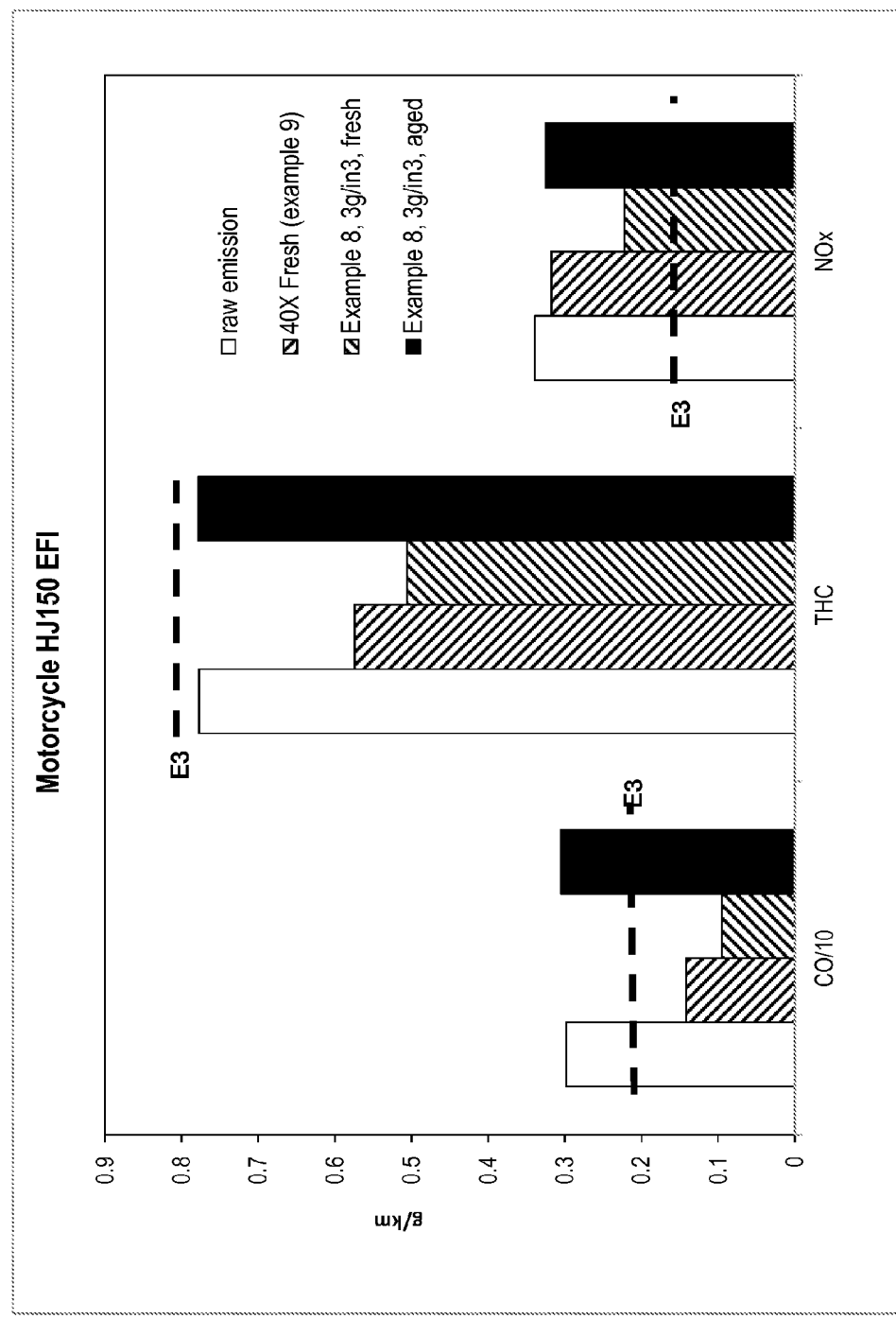
FIG. 11 shows the emission of carbon monoxide, hydrocarbons and NOx after treatment with several catalytic articles.

Layering Washcoat Structure: Motorcycle (Lean)
  The results of CO, total hydrocarbons (THC) and NOx emissions for Example 9 fresh, Example 8 fresh and Example 8 aged are shown in FIG. 11. As seen from the figure, when operated with a lean engine, the combined catalyst described in example 8 does show improvement in TWC activity over the non-PGM-metal formulation A. These results are consistent with the rich engine test. Loss in TWC activity of example 8 catalyst after aging indicates possible poisoning of PGM by CuMn formulation.

These results show the complexity and unpredictability of mobile emission catalyst performance. The performance may be affected by the type of vehicle and operating modes. The overall performance may also influenced by catalyst preparation procedure, washcoat architecture, etc.

Figure 12:
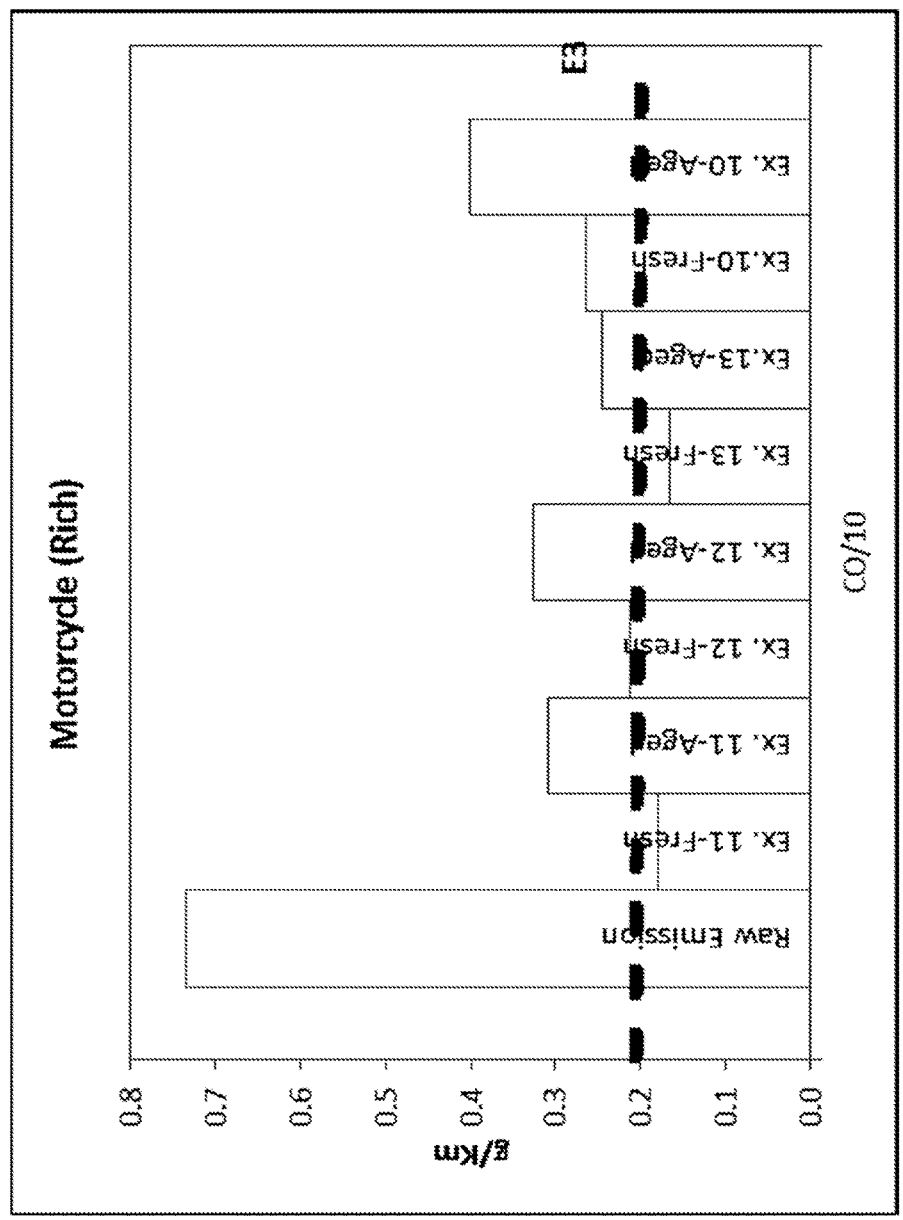
FIG. 12 shows the emission of carbon monoxide after treatment with several catalytic articles.
Figure 13:
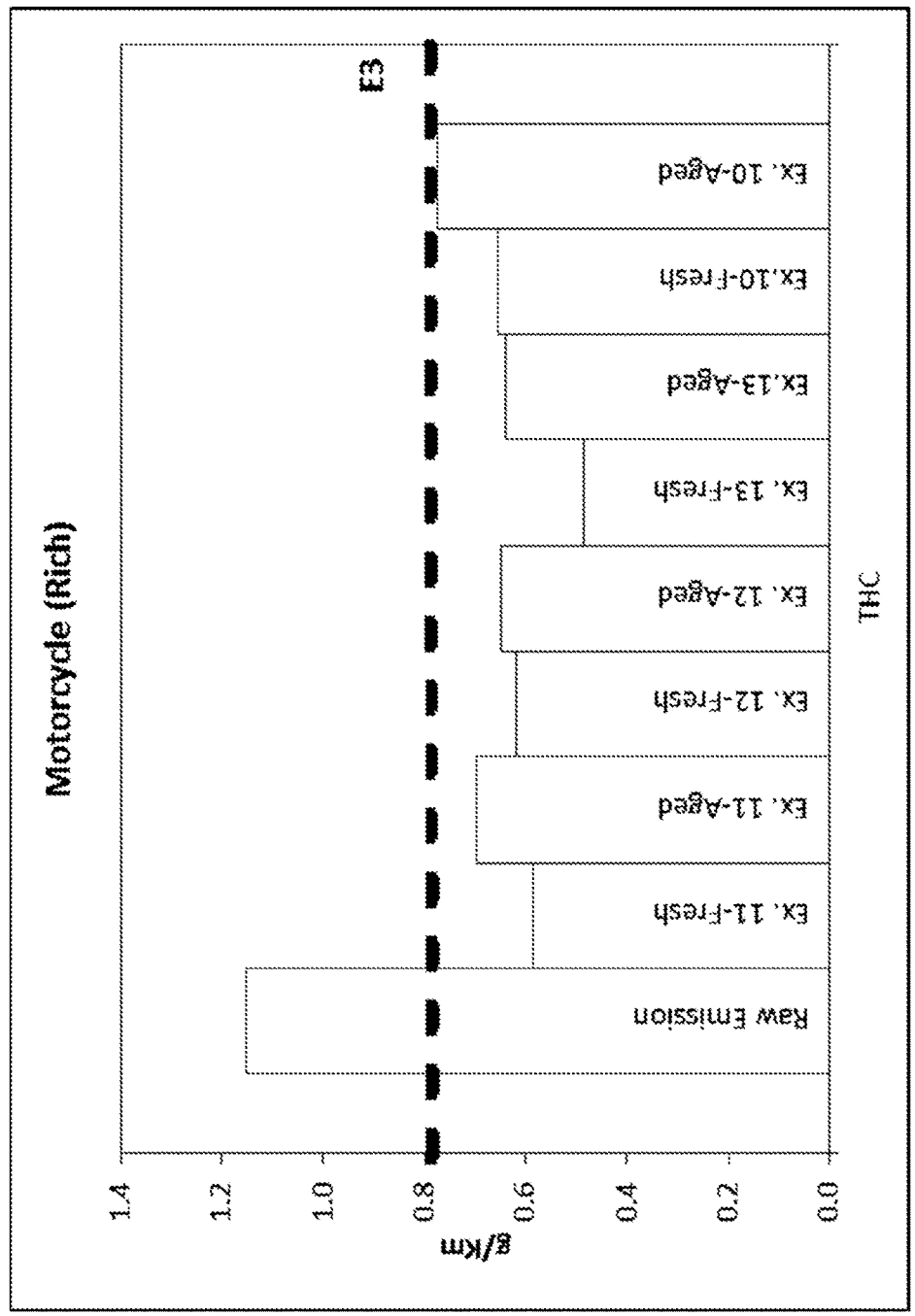
FIG. 13 shows the emission of total hydrocarbons after treatment with several catalytic articles.
Figure 14:
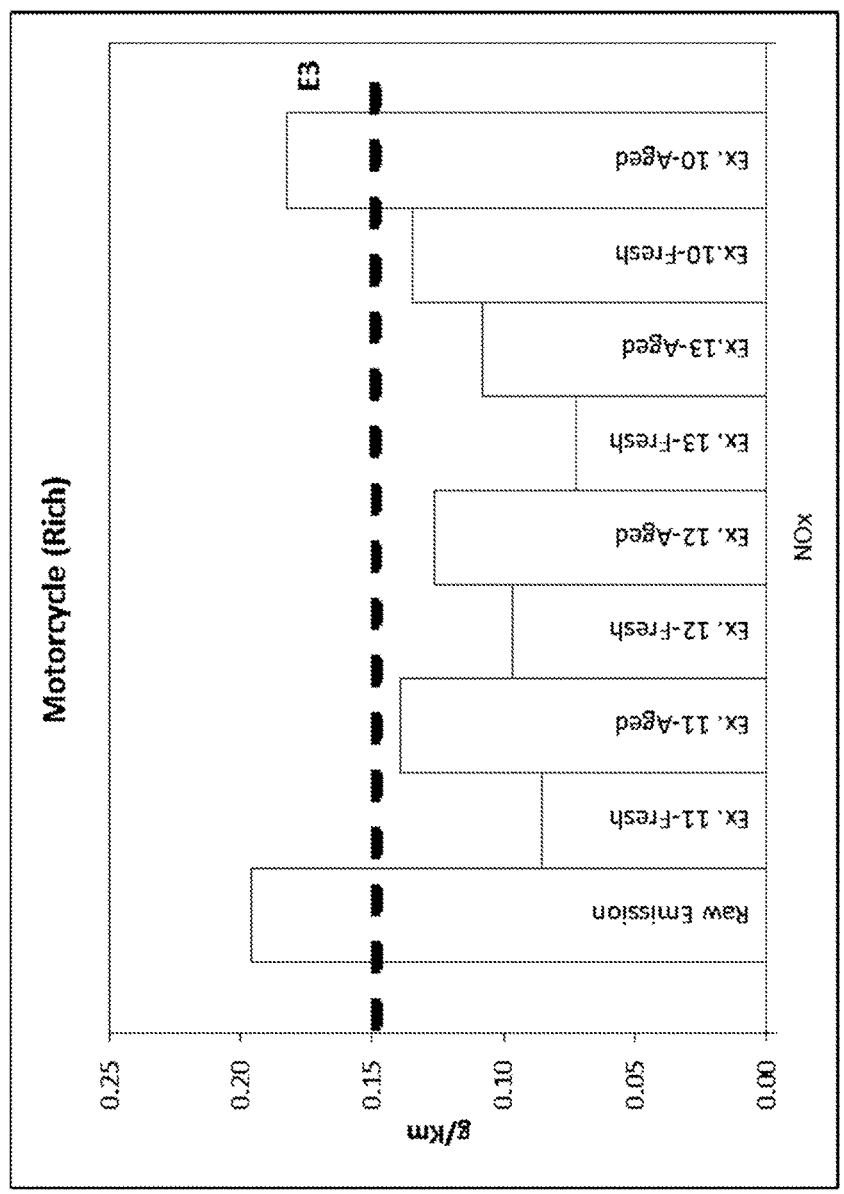
FIG. 14 shows the emission of NOx after treatment with several catalytic articles.

Zoned Washcoat Structure: Motorcycle (Rich)
  Zoned catalysts were also tested for total hydrocarbons (THC), NOx and carbon monoxide emissions, the results of which are shown in FIGS. 12-14, respectively. As seen from the figures, zone-coated samples show much improved TWC performance with rich motorcycle engine operation and much improved thermal stability against aging. Even after aging, all zone-coating samples meet E3 emission requirements.

Figure 15:
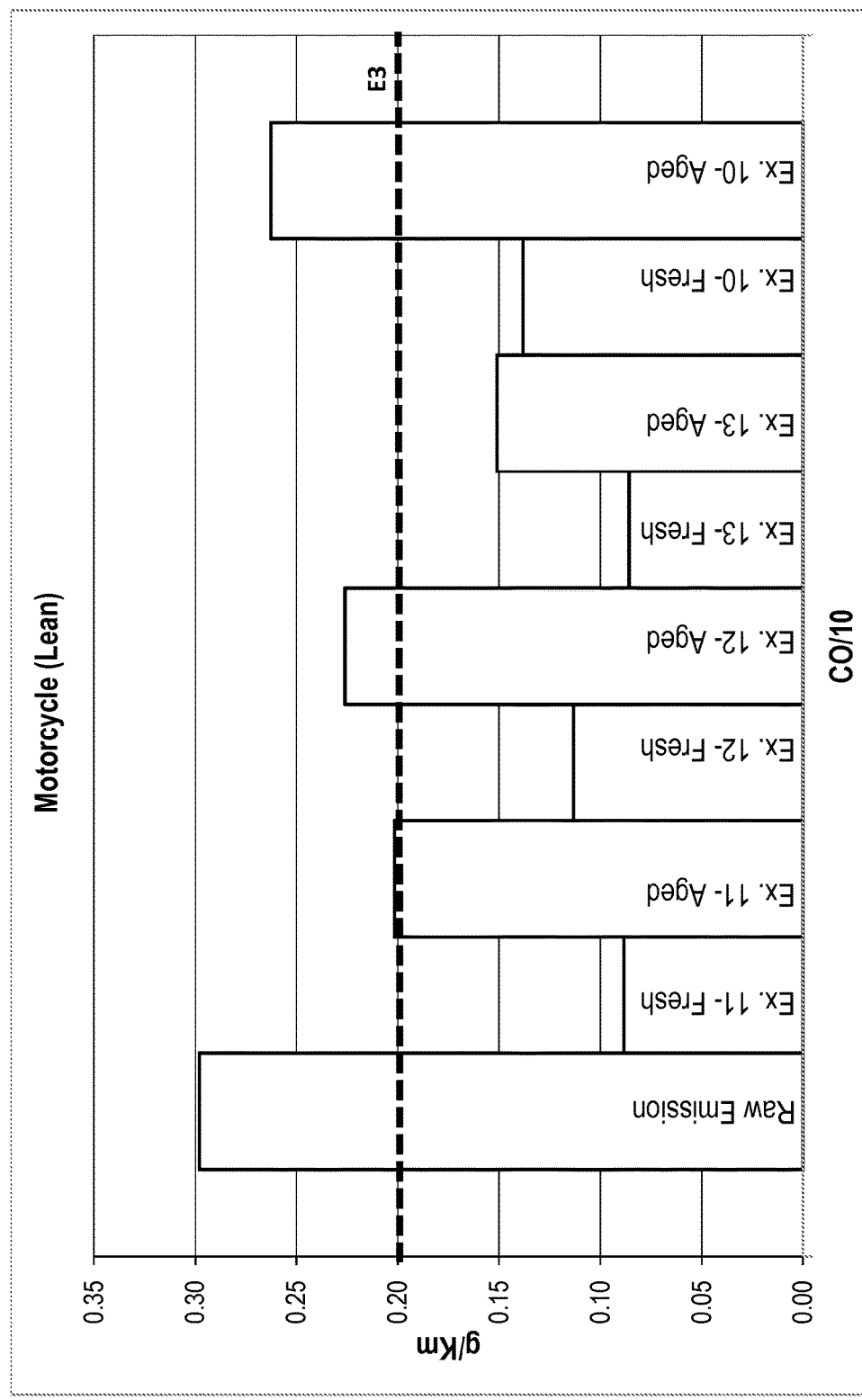
FIG. 15 shows the emission of carbon monoxide after treatment with several catalytic articles.
Figure 16:
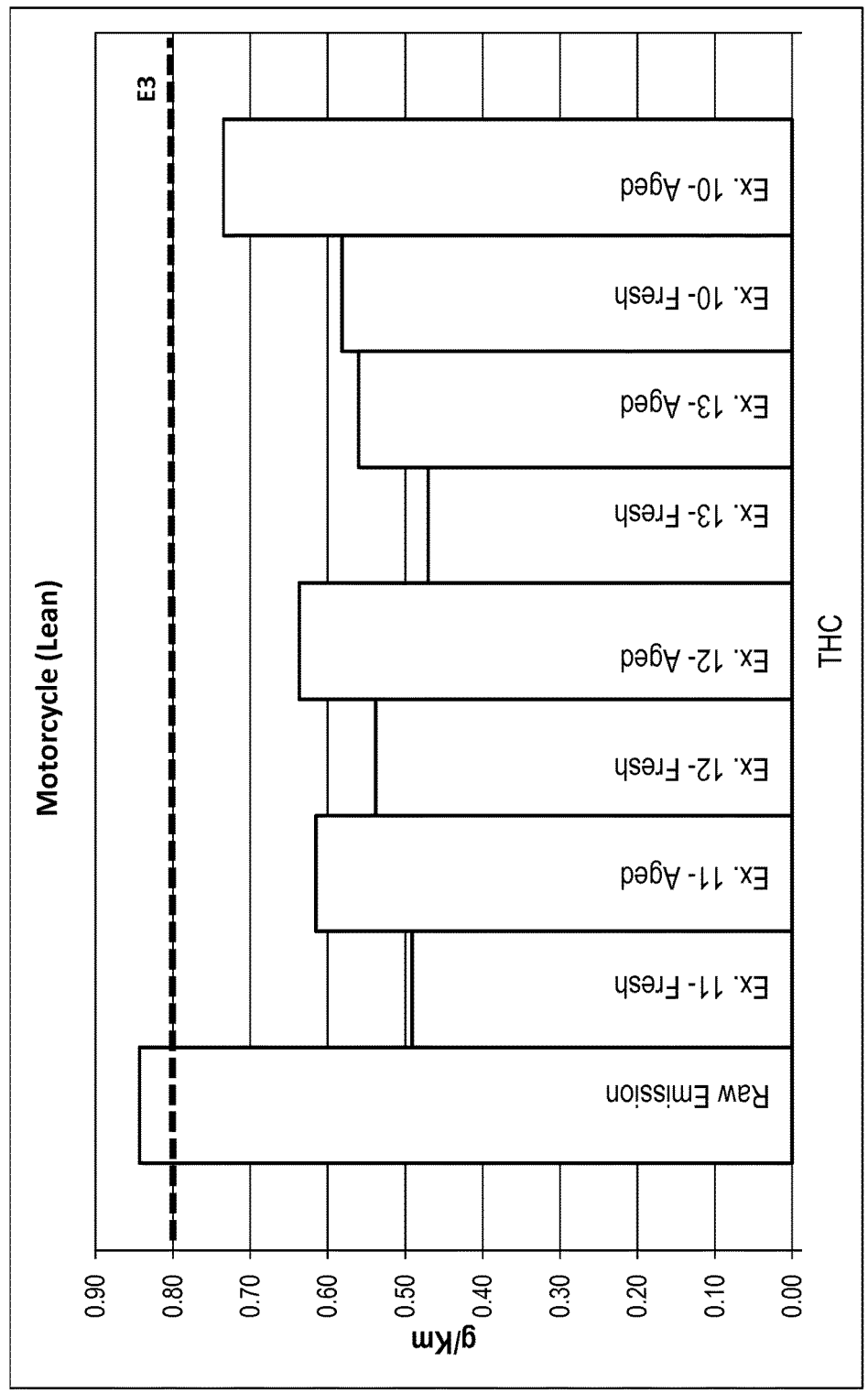
FIG. 16 shows the emission of total hydrocarbons after treatment with several catalytic articles.
Figure 17:
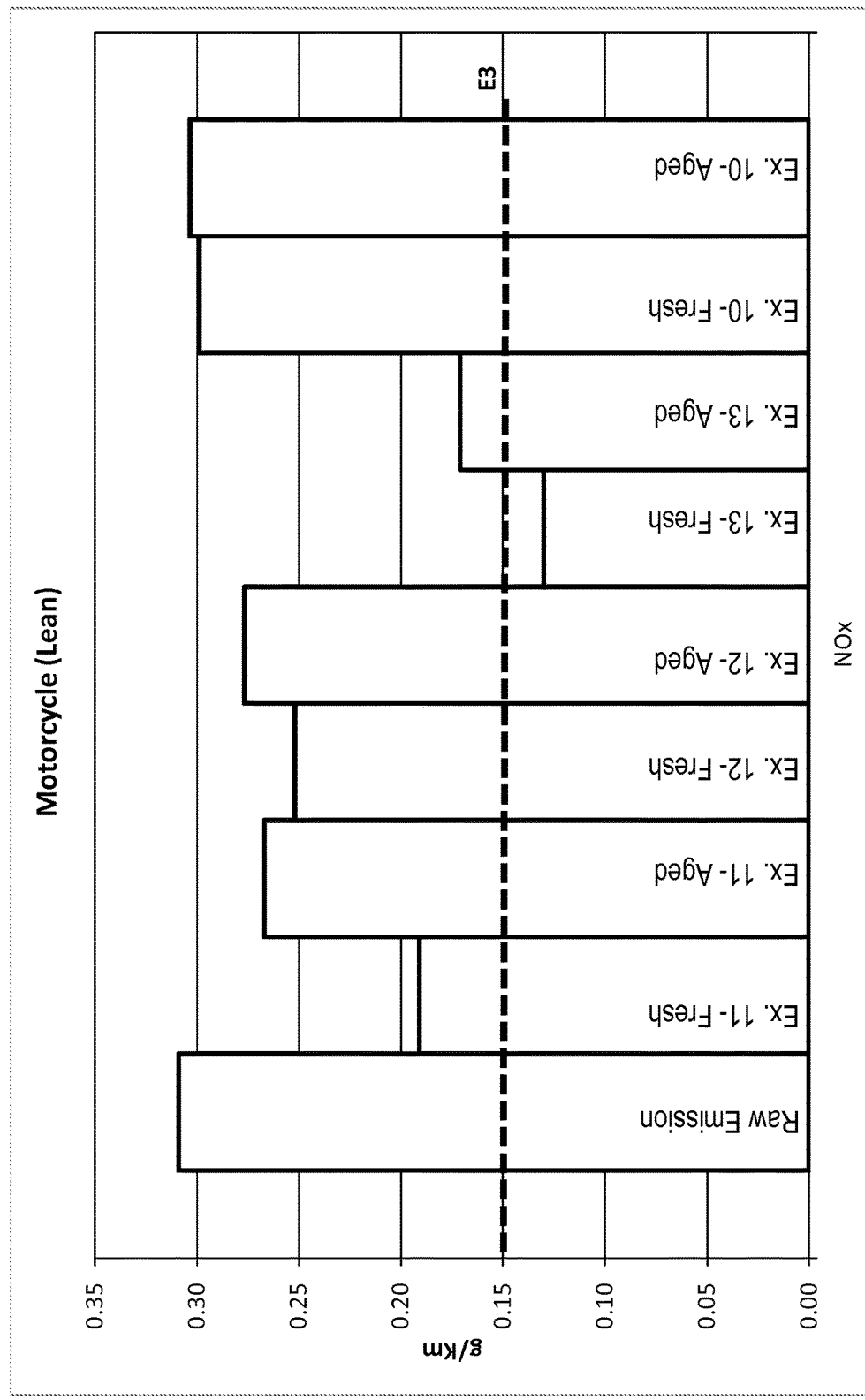
FIG. 17 shows the emission of NOx after treatment with several catalytic articles.

Zoned Washcoat Structure: Motorcycle (Lean)
  The zoned catalyst samples were tested for CO, THC and NOx emissions. The results of these tests are shown in FIGS. 15-17, respectively. As shown in the figures, under lean engine operation conditions, the CuMn non-PGM metal TWC did not show much activity for NOx conversion. Significant improvement in TWC performance, particularly for NOx conversions were achieved by zone coating of PGM, especially for Rh (10 g/ft$^3$) in the inlet section of the monolith (Example 13). Further, the zone coated catalyst also show much improved thermal stability for TWC against aging.

Testing of Catalytic Articles on Utility Engines

A Non-PGM and several catalysts of layering structure with Pd-containing top layer/Non-PGM bottom layer and were illustrated through following examples.

Example 14

A sample was prepared using the same procedure as described in Example 10 (non-PGM catalyst) except that a CuO content of 15 wt % was used.

Examples 15-17

Several catalysts containing a non-PGM under/bottom layer and a Pd-containing top layer with varied Pd loading of 20, 40 and 60 g/ft3 (Table 4) were prepared.

TABLE 4

| Examples for small utility engine emission control | |
| --- | --- |
| Example No. | Sample Description |
| Example 14 | 15%CuO, 5%MnO2, no PGM |
| Example 15 | 20 g Pd/ft3, top coat |
| Example 16 | 40 g Pd/ft3, top coat |
| Example 17 | 60 g Pd/ft3, top coat |

Metal honeycomb substrates with a dimension of 35 mm diameter and 25.4 mm length and a cell density of 300 cpsi were the support used for all samples preparation. The targeted washcoat loading was 2 g/in3 with about equally spilt washcoat loadings for Pd-containing top layer and PGM-Free bottom/under layer.

Incipient wetness of a Pd nitrate salt was applied to two alumina oxide sources. One of the alumina sources was first milled to 13-14 microns (D90) and the second impregnated alumina was added into the mill as a "last pass." From there, the impregnated aluminas were combined with an alumina oxide binder at 2 wt % of the alumina and zirconium acetate targeted at 9% dry gain of the wash coat was used as an in-situ binding and rheological agent to control viscosity. These catalysts were then dried and calcined using the same procedures described in Example 1-13.

The samples were tested on a two strokes utility engine (42.7 cc) with a five mode testing cycle (Table 5).

TABLE 5

Utility engine testing/Aging Conditions

| | |
|---|---|
| Stroke | 2S |
| Rated speed (rpm) | 8500 |
| Engine capacity(cc) | 124 |
| oil-fuel ratio | 1:20 |
| poison(T202)*-fuel ratio | 1:1000 |

Aging time total 7.5 hours

| Testing/aging cycle mode | speed r/min. | gun % | run time min | max inlet temp** ° C. |
|---|---|---|---|---|
| 1 | 2500 | 40 | 3 | 240 |
| 2 | 4000 | 70 | 9 | 510 |
| 3 | 3500 | 60 | 6 | 460 |
| 4 | 5000 | 80 | 3 | 560 |
| 5 | 3000 | 45 | 9 | 420 |

Figure 18:
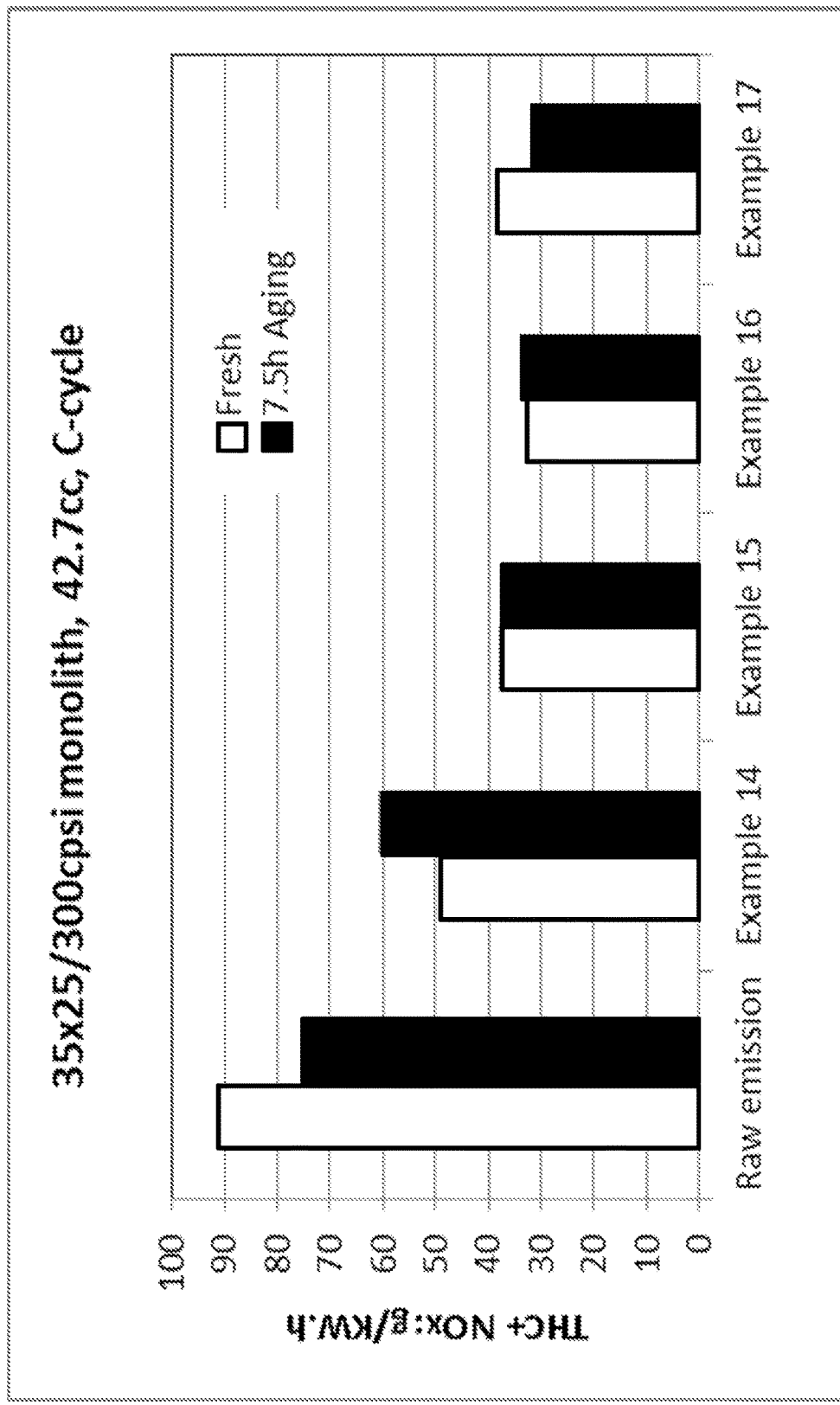
FIG. 18 shows emissions by several catalytic articles of both fresh and aged for 7.5 hours according to one or more embodiments of the invention.

FIG. 18 illustrates engine emissions (THC+NOx) results of these featured example catalysts in their fresh state and after 7.5 h aging. Significant reduction in emissions were demonstrated with the featured layering structures containing Pd (fresh and aged, FIG. 18).

Example 18 Preparation of Pd+Rh Catalyst

A composite having a catalytic material was prepared using single layer. The components present in the layer were high surface gamma alumina, binder alumina, ceria, Pd oxide and Rh oxide at concentrations of approximately 35%, 1.5%, 62%, 1% and 0.5% weight, respectively, based on the calcined weight of the catalyst layer. The total loading of the layer was 1.44 g/in$^3$. The palladium and rhodium in the form of a palladium nitrate solution and rhodium nitrate solution were impregnated by planetary mixer on to the stabilized alumina and ceria to form a wet powder while achieving incipient wetness. The binder alumina was introduced as colloidal solution. An aqueous slurry around 40% solid content was formed by combining all of the above components with water, and milling to a particle size of 90% less than 15 microns. The slurry was coated onto a ceramic or metallic carrier using deposition methods. After coating, the carrier plus the layer were dried for 1-2 hours at temperature of 110° C., and then were calcined at a temperature of 500° C. for about 4 hour.

Example 19 Preparation of Cu+Mn Catalyst

A composite having a catalytic material was prepared using single layer. The components present in the layer were high surface gamma alumina, binder alumina, ceria, CuO and MnO$_2$ at concentrations of approximately 16%, 3%, 67%, 7% and 7% weight, respectively, based on the calcined weight of the catalyst layer. The total loading of the layer was 2.5 g/in$^3$. The copper and manganese in the form of a copper nitrate solution and manganese nitrate solution were impregnated by planetary mixer on to the stabilized alumina and ceria to form a wet powder while achieving incipient wetness. The binder alumina was introduced as colloidal solution. An aqueous slurry around 40% solid content was formed by combining all of the above components with water, and milling to a particle size of 90% less than 15 microns. The slurry was coated onto a ceramic carrier using deposition methods. After coating, the carrier plus the layer were dried for 1-2 hours at temperature of 110° C., and then were calcined at a temperature of 500° C. for about 4 hour.

Example 20 Preparation of Pd+Rh+Cu+Mn Catalyst

A composite having a catalytic material was prepared using 2 layers: an inner layer and an outer layer.
The preparation of inner layer is as previous examples 19.
The outer layer's preparation is as previous examples 18.

Example 21 Preparation of Pd+Rh+Cu+Mn Catalyst+Alumina Layer

A composite having a catalytic material was prepared using 3 layers: an inner layer, alumina layer and outer layer.
The preparation of inner layer is as previous example 19.
The components present in the alumina layer were high surface gamma alumina and binder alumina at concentrations of approximately 97% and 3%, respectively, based on the calcined weight of the catalyst layer. The loading of alumina layer was 0.8 g/in$^3$. The binder alumina was introduced as colloidal solution. Aqueous slurry around 30% solid content was formed by combining all of the above components with water, and milling to a particle size of 90% less than 12 microns. The slurry was coated onto a ceramic or metallic carrier over the inner layer using deposition methods. After coating, the carrier plus the layer were dried for 1-2 hours at temperature of 110° C., and then were calcined at a temperature of 500° C. for about 4 hour.
The outer layer's preparation is as previous example 18.

Effect of Pd/Rh Layer on CO/NO$_x$ Emissions

The catalysts of Examples 17 to 21 were compared. CO/NO$_x$ conversion post hydrothermal aging with an alternate Lean (2% O$_2$)-Rich (3% CO & 1% H$_2$) feed gases at 850° C. for 4 hours was tested on a reactor with simulated ECE test cycle. Table 1 illustrates the results.

TABLE 1

| Catalyst description (example) | CO emission (g/L cat) | NOx emission (g/L cat) |
|---|---|---|
| (18). 1% Pd + 0.5% Rh (PGM layer) | 1.89 | 0.36 |
| (19). 7% Cu + 7% Mn (BMO layer) | 1.62 | 4.48 |
| (20). Outer: 1.0% Pd + 0.5% Rh; + Inner: (7% Cu + 7% Mn) | 1.69 | 0.38 |
| (21). Outer: 1.0% Pd + 0.5% Rh + Middle: Alumina + Inner: 7% Cu + 7% Mn | 1.71 | 0.30 |

The results indicated that the addition of Cu/Mn layer under a low precious metal loading Pd/Rh layer, could improve the aged catalyst performance. Furthermore, adding a barrier blank alumina middle coat was beneficial to NOx activity. SEM and EDS analysis suggested that retarded Cu/Mn migration during catalyst making and/or hydrothermal aging which reduced poisoning of PGM by Cu/Mn.

Preparation of Pd+Rh+Cu+Mn Catalyst+Barrier Layer

A composite having a catalytic material was prepared using 3 layers: an inner layer, metal oxide/alumina layer and outer layer. The metal oxide could be NiO, CeO$_2$, La$_2$O$_3$, NdO, BaO, etc.
The preparation of inner layer is as previous example 19.
The components present in the metal oxide/alumina layer were high surface gamma alumina, binder alumina, and metal oxide at concentrations of approximately 87%, 3%, and 10% weight, respectively, based on the calcined weight of the catalyst layer. The loading of alumina layer was 0.8 g/in³. The metal oxide was introduced as nitrate solution. The binder alumina was introduced as colloidal solution. Aqueous slurry around 30% solid content was formed by combining all of the above components with water, and milling to a particle size of 90% less than 12 microns. The slurry was coated onto a ceramic or metallic carrier over the inner layer using deposition methods. After coating, the carrier plus the layer were dried for 1-2 hours at temperature of 110° C., and then were calcined at a temperature of 500° C. for about 4 hour.

The outer layer's preparation is as previous example 18.

Example 22 Preparation of Pd+Rh+Cu+Mn Catalyst+NiO/Alumina Barrier Layer

A composite having a catalytic material was prepared using 3 layers: an inner layer, NiO/alumina layer and outer layer.

The preparation of inner layer is as previous examples 19.

The components present in the NiO/alumina layer were high surface gamma alumina, binder alumina, and nickel oxide at concentrations of approximately 87%, 3%, and 10% weight, respectively, based on the calcined weight of the catalyst layer. The loading of alumina layer was 0.8 g/in³. The nickel oxide and binder alumina were introduced as colloidal solution. Aqueous slurry around 30% solid content was formed by combining all of the above components with water, and milling to a particle size of 90% less than 12 microns. The slurry was coated onto a ceramic or metallic carrier over the inner layer using deposition methods. After coating, the carrier plus the layer were dried for 1-2 hours at temperature of 110° C., and then were calcined at a temperature of 500° C. for about 4 hour.

The outer layer's preparation is as previous example 18.

Example 23 Preparation of Pd+Rh+Cu+Mn Catalyst+CeO2/Alumina Barrier Layer

A composite having a catalytic material was prepared using 3 layers: an inner layer, CeO₂/alumina layer and outer layer.

The preparation of inner layer is as previous example 19.

The components present in the CeO₂/alumina layer were high surface gamma alumina, binder alumina, and ceria at concentrations of approximately 87%, 3%, and 10% weight, respectively, based on the calcined weight of the catalyst layer. The loading of alumina layer was 0.8 g/in³. The subsequent procedures would follow those in middle layer of example 22. The outer layer's preparation is as previous examples 18.

Example 24 Preparation of Pd+Rh+Cu+Mn Catalyst+BaO/Alumina Barrier Layer

A composite having a catalytic material was prepared using 3 layers: an inner layer, BaO/alumina layer and outer layer.

The preparation of inner layer is as previous examples 19.

The components present in the BaO/alumina layer were high surface gamma alumina, binder alumina, and barium oxide at concentrations of approximately 90%, and 10% weight, respectively, based on the calcined weight of the catalyst layer. The loading of alumina layer was 0.8 g/in³. The barium oxide and binder alumina were introduced as colloidal solution. The subsequent procedures would follow those in middle layer of example 22. The outer layer's preparation is as previous example 18.

Effect of Middle Layer on Three-Way Performance Improvement

The catalysts of Examples 18-25 were disposed on a ceramic or metallic honeycomb flow-through substrate to form three-way catalysts. The TWCs were placed in the exhaust gas stream of a vehicle, and the catalytic activity (reduction of NOx, oxidation of CO and HC) versus the catalytic activity of a standard catalyst (Example 1) was compared by using ECE test cycle. Table 2 illustrates the results. The % improvement is over a standard catalyst.

| Example | % Improvement for NOx | % Improvement for THC | % Improvement for CO |
|---|---|---|---|
| (18). 1% Pd + 0.5% Rh (reference) | 0 | 0 | 0 |
| (19). 7% Cu + 7% Mn | −98.3 | −10.1 | 20.1 |
| (20). Outer: 1% Pd + 0.5% Rh + inner: 7% Cu + 7% Mn | −0.5 | 2.1 | 18.2 |
| (21). Outer: 1% Pd + 0.5% Rh + Middle: alumina + Inner: 7% Cu + 7% Mn | 15.2 | 0.5 | 8.4 |
| (22). Outer: 1% Pd + 0.5% Rh + Middle: 10% NiO/Alumina + Inner: 7% Cu + 7% Mn | 7.1 | −0.7 | 7.1 |
| (23). Outer: 1% Pd + 0.5% Rh + Middle: 10% CeO₂/Alumina + Inner: 7% Cu + 7% Mn | 8.3 | 1.5 | 9.2 |
| (24). Outer: 1% Pd + 0.5% Rh + Middle: 10% BaO/Alumina + Inner: 7% Cu + 7% Mn | 20.2 | 1.0 | 6.3 |

The results indicate that the three-way catalysts containing a middle barrier layer between the inner Cu/Mn layer and the outer Pd/Rh layer (Examples 17-24) show the significant improvement in NO$_x$ conversions over the standard BMO (19), PGM (18) catalysts, or combined (20).

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article comprising
   a first catalytic coating comprising a platinum group metal supported on a first carrier, wherein the first carrier is selected from the group consisting of alumina, ceria, zirconia, ceria-zirconia composite, titania, and combinations thereof, wherein the first catalytic coating is substantially free of Cu, Ni, Fe, Mn, V, Co, Ga, Mo, Mg, Cr and Zn;

a second catalytic coating comprising a non-PGM metal supported on a second non-zeolitic carrier, wherein the non-PGM metal comprises copper (Cu) and manganese (Mn), wherein the second non-zeolitic carrier comprises one or more of alumina, ceria, zirconia, ceria-zirconia composite, and titania, wherein the second catalytic coating comprises less than 1.5 wt. % platinum group metal; and one or more substrates, wherein the first catalytic coating is separated from the second catalytic coating.

2. The catalytic article of claim 1, wherein the first catalytic coating is layered over the second catalytic coating.

3. The catalytic article of claim 2, further comprising a barrier layer between the first and second catalytic coatings.

4. The catalytic article of claim 3, wherein the barrier layer is substantially free of first transition metals selected from Cu, Ni, Fe, Mn, V, Co, Ga, Mo, Mg, Cr and Zn.

5. The catalytic article of claim 3, wherein the barrier layer is substantially free of platinum group metal.

6. The catalytic article of claim 3, wherein the barrier layer comprises a carrier selected from stabilized alumina, ceria, zirconia, ceria-zirconia composite, titania, and combinations thereof.

7. The catalytic article of claim 6, wherein the barrier layer further comprises a stabilizer for the carrier selected from barium, strontium, calcium, magnesium, lanthana, neodymia, praseodymia, yttria and combinations thereof.

8. The catalytic article of claim 1, wherein the first catalytic coating is in an upstream zone from the second catalytic coating.

9. The catalytic article of claim 8, wherein the upstream zone has a length of about 5 to about 90% of the substrate.

10. The catalytic article of claim 1, wherein the platinum group metal comprises Pt, Pd, Rh or a combination thereof.

11. The catalytic article of claim 1, wherein the second non-zeolitic carrier is stabilized by an element selected from the group consisting of La, Ba, Y, Pr, Sr and combinations thereof.

12. The catalytic article of claim 1, wherein the non-PGM metal is present at a loading of greater than 0 to about 50 wt % of the total second catalytic coating loading.

13. The catalytic article of claim 4, wherein the first catalytic coating is on a first substrate and the second catalytic coating is on a second substrate, and the substrates are in contact with each other.

14. The catalytic article of claim 4, wherein the first and second catalytic coatings are on the same substrate.

15. The catalytic article of claim 2, wherein the first and second catalytic coatings together comprise about 5 to about 90% by weight PGM.

16. The catalytic article of claim 1, wherein the first and second catalytic coating are coated onto a wall flow monolith having a plurality of longitudinally extending passages formed by longitudinally extending walls bounding and defining said passages, wherein the passages comprise inlet passages having an open inlet end and a closed outlet end, and outlet passages having a closed inlet end and an open outlet end, and wherein the first or second catalytic coating permeates the walls.

17. A method of making the catalytic article of claim 1, the method comprising:
    providing a first slurry comprising a platinum group metal, wherein the first slurry is substantially free of Cu, Ni, Fe, Mn, V, Co, Ga, Mo, Mg, Cr and Zn;
    providing a second slurry comprising a non-PGM metal, wherein the non-PGM metal comprises copper (Cu) and manganese (Mn), wherein the second slurry is substantially free of any platinum group metal;
    coating one or more substrates with the first and second slurries to provide the catalytic article of claim 1; and
    calcining the catalytic article at a temperature ranging from about 300 to about 1100° C.

18. A method of treating exhaust from an internal combustion engine, the method comprising contacting the exhaust from the engine with the catalytic article of claim 1.

19. A catalytic article comprising
    a first catalytic coating comprising a platinum group metal, wherein the first catalytic coating is substantially free of Cu, Ni, Fe, Mn, V, Co, Ga, Mo, Mg, Cr and Zn;
    a second catalytic coating comprising a non-PGM metal supported on a non-zeolitic carrier, wherein the non-PGM metal comprises copper (Cu) and manganese (Mn), wherein the non-zeolitic carrier comprises one or more of alumina, ceria, zirconia, ceria-zirconia composite, and titania, wherein the second catalytic coating comprises less than 1.5 wt. % platinum group metal;
    a barrier layer between the first and second catalytic coatings; and
    one or more substrates,
    wherein the first catalytic coating is separated from the second catalytic coating.

* * * * *